(12) United States Patent
Kewitsch

(10) Patent No.: US 9,703,060 B2
(45) Date of Patent: Jul. 11, 2017

(54) ULTRA-COMPACT, SOFTWARE-DEFINED FIBER OPTIC PATCH-PANELS

(71) Applicant: Anthony Stephen Kewitsch, Marina del Rey, CA (US)

(72) Inventor: Anthony Stephen Kewitsch, Marina del Rey, CA (US)

(73) Assignee: TELESCENT INC., Marina Del Ray, CA (US)

( * ) Notice: Subject to any disclaimer, the term of this patent is extended or adjusted under 35 U.S.C. 154(b) by 117 days.

(21) Appl. No.: 14/506,653

(22) Filed: Oct. 5, 2014

(65) Prior Publication Data

US 2015/0098698 A1    Apr. 9, 2015

Related U.S. Application Data

(60) Provisional application No. 61/887,244, filed on Oct. 4, 2013.

(51) Int. Cl.
| | | |
|---|---|---|
| *G02B 6/26* | (2006.01) | |
| *G02B 6/42* | (2006.01) | |
| *G02B 6/44* | (2006.01) | |
| *H04Q 11/00* | (2006.01) | |
| *G02B 6/35* | (2006.01) | |

(52) U.S. Cl.
CPC ......... *G02B 6/4452* (2013.01); *G02B 6/3504* (2013.01); *H04Q 11/0005* (2013.01); *G02B 6/3556* (2013.01); *G02B 6/3572* (2013.01); *H04Q 2011/0007* (2013.01)

(58) Field of Classification Search
None
See application file for complete search history.

(56) References Cited

U.S. PATENT DOCUMENTS

| | | | | |
|---|---|---|---|---|
| 4,193,662 A | * | 3/1980 | Hara .................... | G02B 6/3548 335/113 |
| 4,834,488 A | * | 5/1989 | Lee ...................... | G02B 6/3504 385/20 |
| 6,296,397 B1 | * | 10/2001 | Bavington ........... | G02B 6/3504 385/25 |
| 2012/0087622 A1 | * | 4/2012 | Zalitzky ............... | G02B 6/3504 385/20 |

\* cited by examiner

*Primary Examiner* — Chad Smith

(57) ABSTRACT

An automated, robotic patch-panel system in a highly compact form factor implementing Knots and Braids switching algorithms is disclosed. This system incorporates stacked layers of connector ports, each row of connector ports defining an arc with a radius of curvature, wherein the radius of curvature is substantially larger than the total height of the stacked layers. A synchronized gripper pair on a three axis actuation system is used to disconnect, weave and connect fibers arbitrarily across an array of dense connector ports on a curvilinear surface. Each row of connector ports is independently translatable by slight rotation to generate the proper relationship between surrounding fibers and the individual fiber undergoing the multi-step reconfiguration process.

14 Claims, 20 Drawing Sheets

ULTRA-COMPACT, SOFTWARE-DEFINED FIBER OPTIC PATCH-PANELS

BACKGROUND OF THE INVENTION

Large scale software-defined fiber optic patch-panels enable high bandwidth network interconnections within and between data centers to be automated. Current automated patch-panel technologies such as cross-bar switches scale unfavorably in complexity and size as $N^2$, where N is the number of interconnects, significantly limiting their performance. Prior art descriptions of cross-bar switches include U.S. Pat. No. 4,955,686 to Buhrer et al., U.S. Pat. No. 5,050,955 to Sjolinder, U.S. Pat. No. 6,859,575 to Arol et al., and U.S. Patent Application No. 2011/0116739A1 to Safrani et al.

More recent automated patch-panel approaches that scale as N utilize braided fiber optic strands, wherein advances in the mathematics of topology and Knot and Braid Theory (U.S. Pat. Nos. 8,068,715, 8,463,091, 8,488,938 and 8,805,155 to Kewitsch) address the fiber entanglement challenge for dense collections of interconnect strands undergoing arbitrary and repeated reconfiguration. Since this Knots and Braids Switching (KBS) technology scales linearly in the number of interconnect strands, significant benefits over cross-bar switches in terms of density and hardware simplicity are realized.

These KBS-based fully automated patch-panel systems typically utilize a pick and place actuator with a gripper at one end of a robotic arm and sophisticated fiber routing algorithms implemented in control software. The robotic arm is of a sufficiently narrow width, typically less than 12 mm, to allow it to descend into the fiber optic interconnect volume without mechanical interference or contact with surrounding fiber strands. Strands potentially number in the thousands. The fiber switching system typically includes optical fibers in a lower section and a robot in the upper section. Since the internal fiber strands vary in length depending on the distance from their one dimensional backbone guide to the two dimensional array of internal ports, and this variation can be significant in large switching systems, a means of dispensing variable length interconnections has been implemented. This slack fiber management is typically achieved using a stacked arrangement of automatic spring loaded tack-up reels and low friction guiding elements to route these moving fibers through a common backbone and to their termination points across an array of connector ports. The KBS algorithm is necessary to fully automate the non-entangling reconfiguration of large scale, densely braided switches with several hundred to several thousand optical fiber cross-connect circuits, so that no human intervention to disentangle fiber is necessary.

SUMMARY OF THE INVENTION

For the special case of an automated interconnect management system with less than a few hundred fiber optic strands or circuits, it is of great practical advantage that all strands in the reconfigurable interconnection volume are radial lines with fixed, substantially equal lengths. An acceptable criteria for length variation is, for example, that the slack fiber resulting from plugging in the fiber strand in different locations across the array of connector ports is less than 10% of the nominal length of the radial lines. This specific arrangement eliminates the need for variable slack fiber management and results in significantly enhanced compactness.

Therefore, a versatile but compact multi-signal distribution system is provided that is particularly advantageous for fiber optic circuits, by arranging equal length radial lines in a low elevation, stacked and substantially cylindrical distribution of ports with internal fibers attached therein, which fibers operate under actuation on a concentric base region. Separate external circuits are selectively engageable to and disengageable from the spaced apart ends of the individual radial lines, which lie within an arc of less than 180 degrees about the base region.

The system assures that the target port for the fiber undergoing reconfiguration is open, by first moving a preexisting line at the target port location to an open, parking location or address. Internal circuit reconfigurations are then achieved through a multi-step process, by first disengaging a spaced apart end of a selected fiber line with a connector, separating it adequately from the curvilinear plane of the other lines to the region, just inside of the interconnect region and pivoting circumferentially to a new angular target location above or below the array of lines, to reengage it at the target port.

This arrangement is particularly suited for small scale KBS fiber switching systems because it assures low tension, low stress transport of the fibers and does not produce sharp bending of the fiber. With this approach, one or more additional layers of fibers can be disposed and operated under the same control system, but employing a separate repositioning system for each layer. To this end the assembly includes a multilayer construct of shaped planar elements mounted about a central axis into which input fibers are fed to circumferentially spaced terminals in a plane defined between pairs of arrays leading from the central axis to a pair of curved peripheral members with circumferentially spaced seating elements. Optical fibers feed separate inputs into couplers spaced along this periphery, and on the opposite side detachable couplers connect with intermediate radial fibers to a central backbone array. These radial fibers lead at different angles within the same plane to the backbone array that converges into the output fibers for the system. The assembly of converging fibers is rotatable only through small angles.

Systems in accordance with the invention further employ a novel coupling and decoupling mechanism for engaging and releasing the individual terminals of the optical lines in an array during operation and connection to a target line. The system includes a miniaturized mechanism for engagement and movement of any selected fiber just inside of the curved arc of the connectors, which mechanism moves through a sufficient arc to encompass all fibers in the planes. The engagement mechanism include an individual, small ferrous body at the engagement end of each connectorized fiber, whereby the ferrous body of high magnetic permeability and the magnet(s) exhibit an attraction force therebetween. This mechanism is positionable in rotation angle and elevation to any selected fiber along the array and is radially actuatable to engage the terminal component of a selected fiber, which it can them move in elevation above or below along the arc(s) of connectors to a chosen target location, where it is implanted and the engagement mechanism becomes available for transferring another fiber on demand.

DETAILED DESCRIPTION OF THE INVENTION

Figure 1:
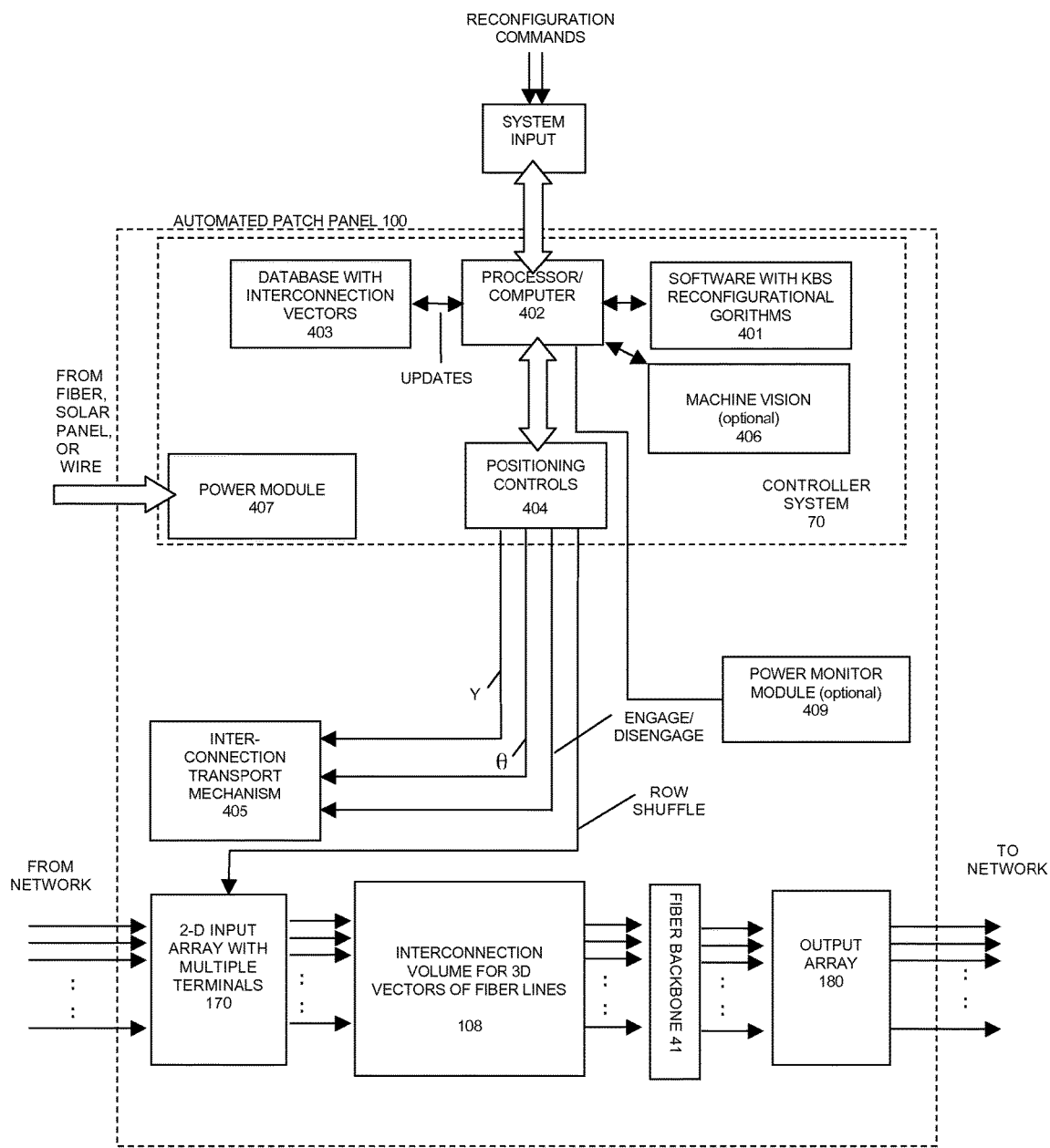
FIG. 1 depicts a block diagram of the general arrangement and interrelations of principal units in a system in accordance with the invention.

The application on which this application claims priority under 35 USC 119(e), U.S. Provisional App. No. 61/887,244, is hereby incorporated by reference in its entirety. In this invention, all-fiber software-defined cross-connect systems 100 enabling reconfigurable, non-blocking and optically transparent physical connections between fiber optic lines joining a first network to a second network are disclosed. A block diagram of the functional elements comprising this cross-connect system and the inter-relationships between elements is illustrated in FIG. 1. Reconfiguration of flexible fiber optic lines with an outer diameter of 0.5 mm or less and maintaining at least a minimum radius of curvature of 5 mm is performed within interconnect volume 108 immediately adjacent the two dimensional array 170, by repeating a deterministic sequence of disengaging, translating and re-engaging fiber line connectors 65 adjacent to the internal surface of the cylindrical, two-dimensional input array 170 of terminals, while under the control of the interconnection transport mechanism 405. The interconnect volume 108 is bounded by the array of terminals 170 and on the opposite side by a fixed, substantially one-dimensional array of diverging fibers forming a fixed fiber backbone 41 lying at an intermediate plane within the cross-connect system and near the system's central pivot point 11. The interconnect volume therebetween is filled with the inter-mixed, substantially linear fiber lines 21 free of knots, curls or loops. Fiber lines are suspended between arrays of terminals 170 and backbone termination point 41 with at least a minimum radius of curvature, typically greater than 5 mm, sufficient to ensure that excess insertion loss is small (<0.5 dB). Said lines define a three-dimensional arrangement of vectors directed towards the one-dimensional array 41.

Non-interference of fiber lines within interconnect volume 108 during arbitrary reconfiguration of any fiber line within the multiplicity of surrounding fiber lines is achieved when the processor 402 directs positioning controls 404 to drive the interconnection transport mechanism 405 and translate the origin of a vector associated with a selected fiber line 21 through the region of interconnect volume 108 immediately adjacent to the two-dimensional curvilinear input array of terminals 170. The fiber lines comprise a multiplicity of independent subbraids 101, providing clearance regions between subbraids that are suitably sized, typically 5-10 mm wide, to enable carriage of any fiber 21 by the interconnect transport system 405. Movement of this fiber proceeds in a sequential, column by column (or equivalently subbraid by subbraid) fashion, a repetition of steps as set forth in FIG. 21, such that the moveable vector endpoint of a strand 21 passes through the gap between subbraids or columns and weaves through the surrounding space of vectors in a non-interfering fashion.

Figure 13:
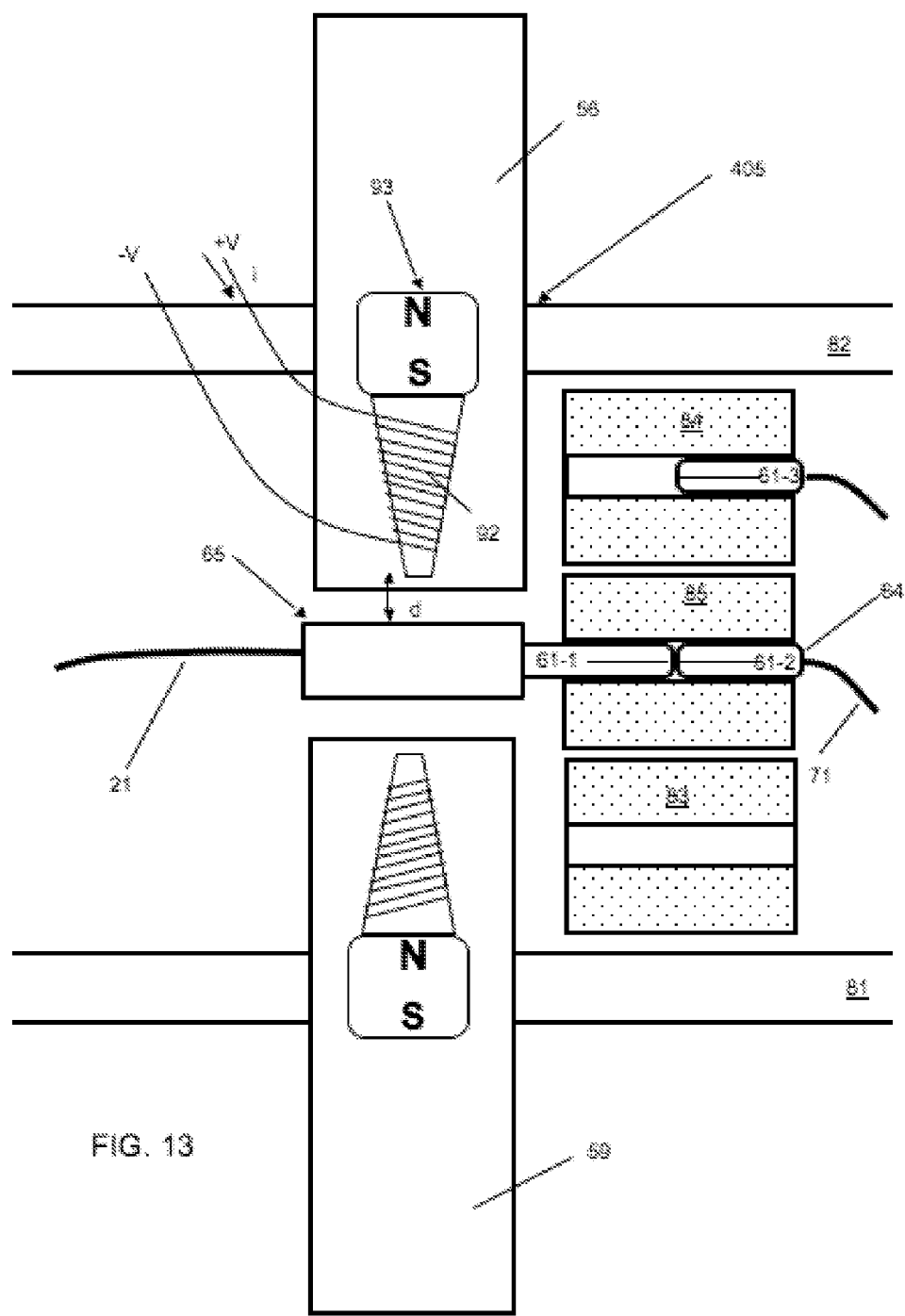
FIG. 13 shows a simplified cross-sectional view of the synchronized gripper pair in relation to the connector row arcs, with a fiber connector in the vicinity of the grippers.

Translation of the particular fiber line endpoint above, below, up or down columns of the input array is achieved by manipulating the position of fiber line connector body with one or more gripper devices integral to the interconnection transport mechanism 405. In a particular example illustrated in FIG. 13, this mechanism consists of a synchronized gripper pair, e.g. a combination of an upper gripper 56 and lower gripper 59, that act in coordination and reside on a common platform able to programmably rotate across the full arc-length of the curved input array 170. Carriage of the fiber line connector 61, in a manner that prevents entanglement of the fiber line attached thereto and affixed at an intermediate length location within the backbone 41, is directed by electronic positioning controls 404 that respond to instructions generated by controller 402. The controller executes multiple processes including path computation using reconfiguration algorithms 401 and the management of the database of interconnections 403 in real time.

Electrical power is provided to the system through the power module 407. In a particular embodiment, the cross-connect system consumes <100 W of power during the ~1 minute reconfiguration time and negligible power otherwise by entering a "sleep" mode. The cross-connect apparatus can be powered not only with a building's ac or dc line voltage, but for remote applications, alternatively utilize solar power or photonic power transmitted within fiber and with electrical storage means such as an internal battery.

In a further example, reconfiguration is initiated by a user or external software client by entering a starting port and destination port for a particular fiber strand at the input terminal array into the processor 402 to software-define the fiber connectivity. The processor communicates with the multiple components comprising the controller system 70 to direct the required multi-step reconfiguration process, based in part on reading the current database of interconnection vectors 400.

Figure 2:
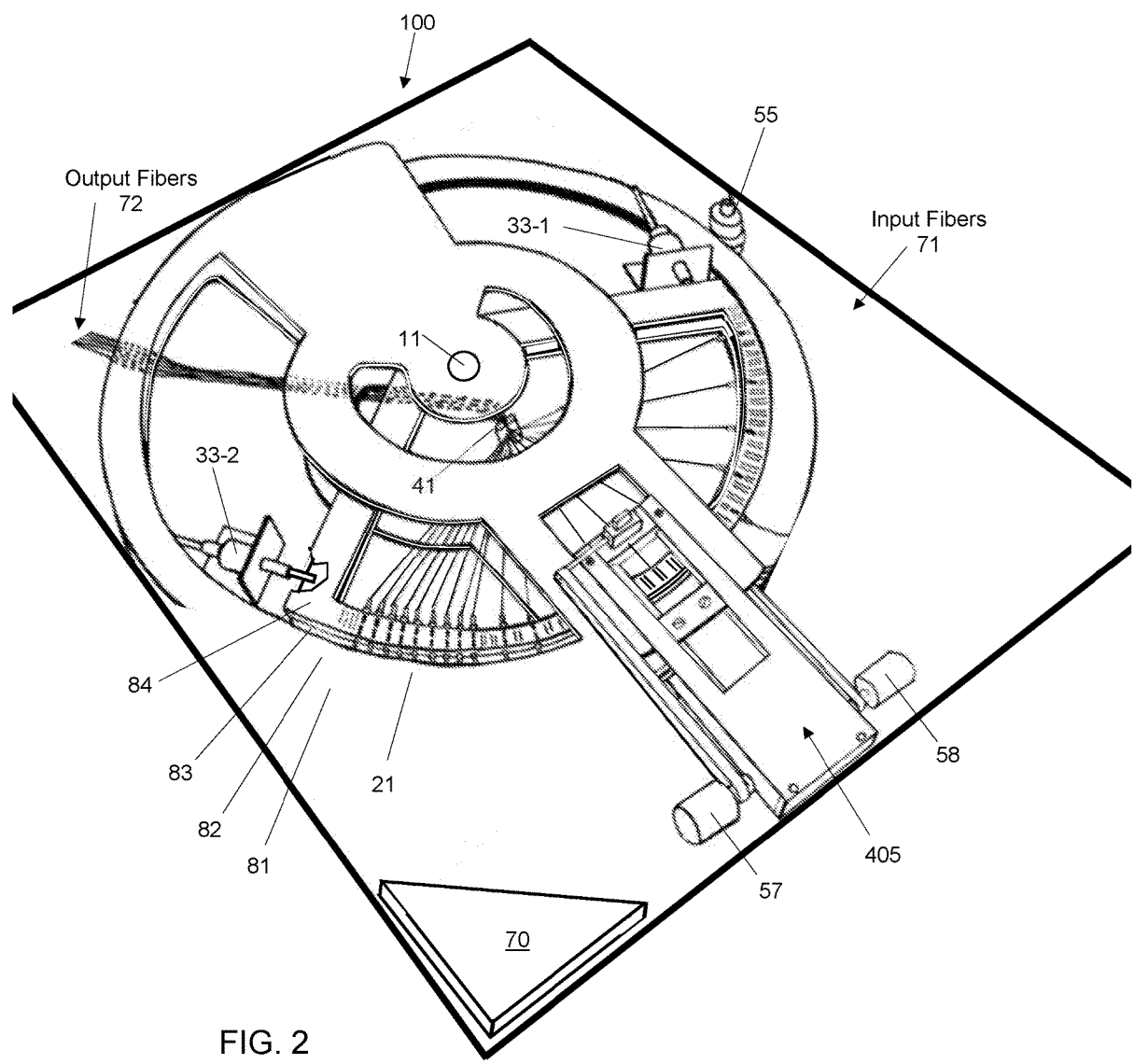
FIG. 2 is perspective view illustrating an example of the miniaturized, low profile multiport, multilayer cross-connect system in cylindrical coordinates.

In a particular implementation of the interconnection transport mechanism, the motion of the gripper(s) while disengaging, engaging and moving a fiber line is synchronized with programmed, incremental rotations of each row comprising the mutable two-dimensional array of terminals 170, enabling the vector (i.e. fiber) undergoing reconfiguration to maintain the proper orientation relative to surrounding vectors such that entanglement is avoided at all times and for all potential reconfigurations. A perspective view of the cross-connect system incorporating these and additional elements is illustrated in FIG. 2, with only a subset of fiber lines 21 and input/output lines shown for clarity.

Figure 5:
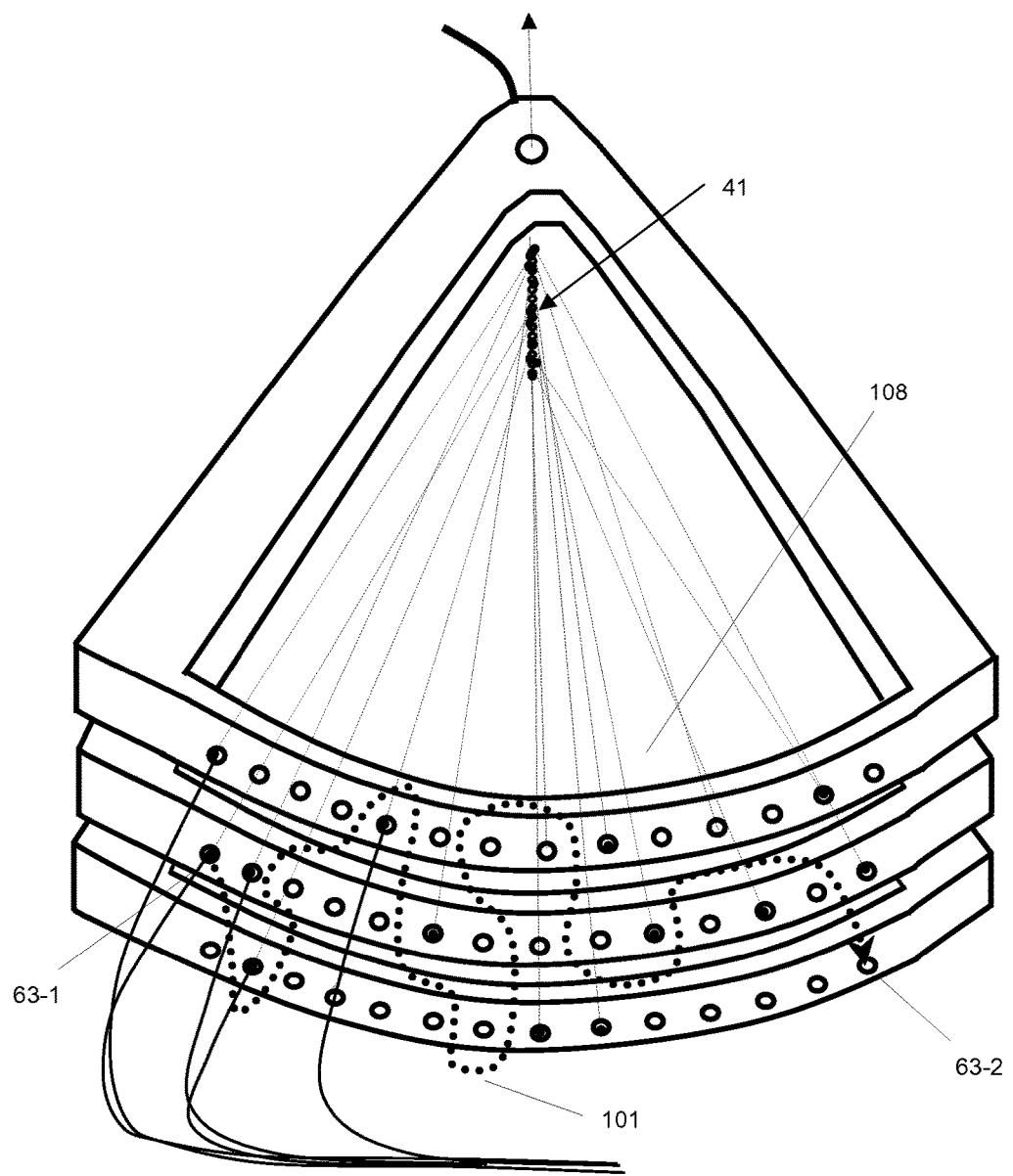
FIG. 5 illustrates a path of a fiber in the vicinity of the connector arcs, as it traces out a KBS generated non-interfering path between adjacent fibers to move from a starting location to a target location.

In accordance with the invention, software-driven reconfiguration in a volume which scales as N, the number of fiber ports, is accomplished by linking the two-dimensional curved array of input terminals 170 with fixed length fiber optic circuits 21 spanning the switch's cross connect volume 108 and extending from a one-dimensional fixed fiber arrangement at the intermediate optical switch backbone 41, substantially parallel to pivot axis 11. In a preferred embodiment, any of the fiber circuits 21 are arbitrarily reconfigurable by mechanically engaging or latching onto a selected fiber connector 63 including a magnetic element 27 and ferrule 61 with a pair of programmably moveable and reciprocating grippers 56, 59, to reposition connectorized fiber optic circuits 21 by moving within interstitial regions in elevation and angle at the interior surface of the array of switch terminals 170. Non-interfering reconfiguration is accomplished by following a non-blocking path 103 (the dotted line in FIG. 5) as computed by the switch control system 70, which incorporates deterministic accounting of the geometrical configuration of all intermediate lines 21 intermixed within the common interconnect volume 108. This fiber optic switching system 100 is configured to minimize size, reconfiguration time, and to operate with high reliability and high fiber optic port density with, for example, 48×48 to 144×144 ports.

Key features of the switch apparatus 100 and various elements of which are illustrated in FIGS. 2-20 include the incorporation of a physically changeable, two dimensional curved connector array with radius of curvature of the cylindrical surface at least five times larger than the elevation of the connector array. Each row of the connector array corresponds to a particular one of the multiple stacked discs 83, 84, 85-$i$ sharing a common pivot point. Each stacked disc or partial sector thereof is comprised of, for example, 48 individual connector ports 63 distributed over about a 60 degree arc with about a 1.5 degree center to center spacing along the arc, and located near the outer perimeter of the arc. Each disc sector 83, 84 is able to move angularly by at least +/−1.5 degrees to achieve programmed angular shuffling in accordance with this invention. This specific angular disposition of input ports 63 is necessary and sufficient to ensure that all fiber lengths 21 are identical to within +/−10%.

Figure 9:
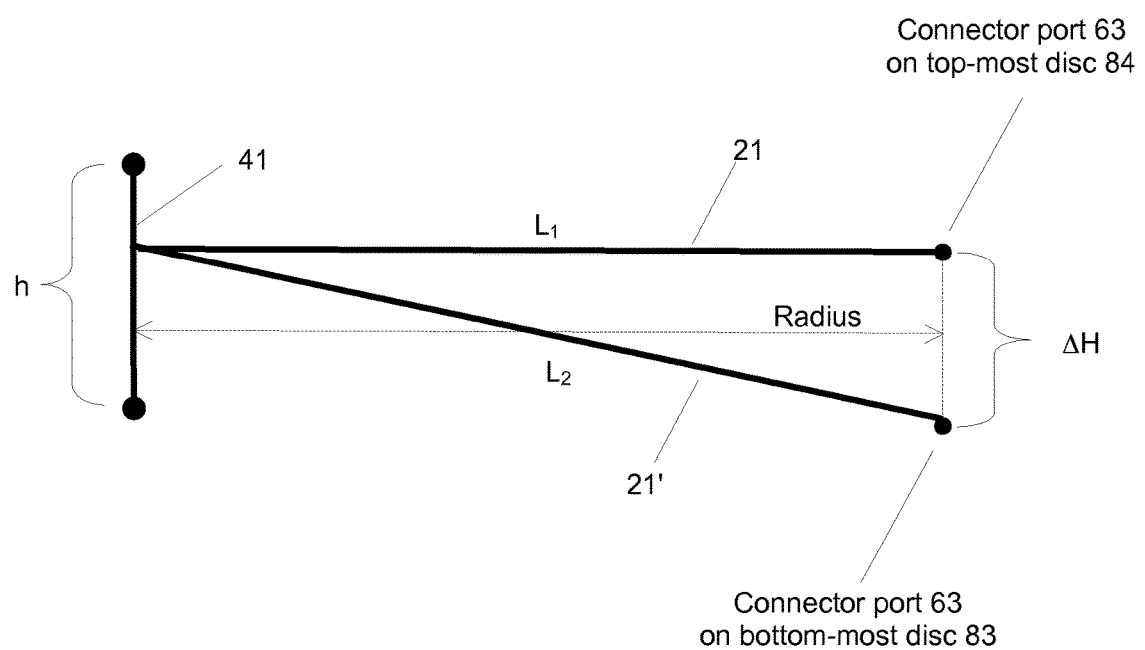
FIG. 9 diagrams the geometrical conditions to maintain all fiber lengths substantially identical and knot-free before, during and after arbitrary reconfiguration.
Figure 10:
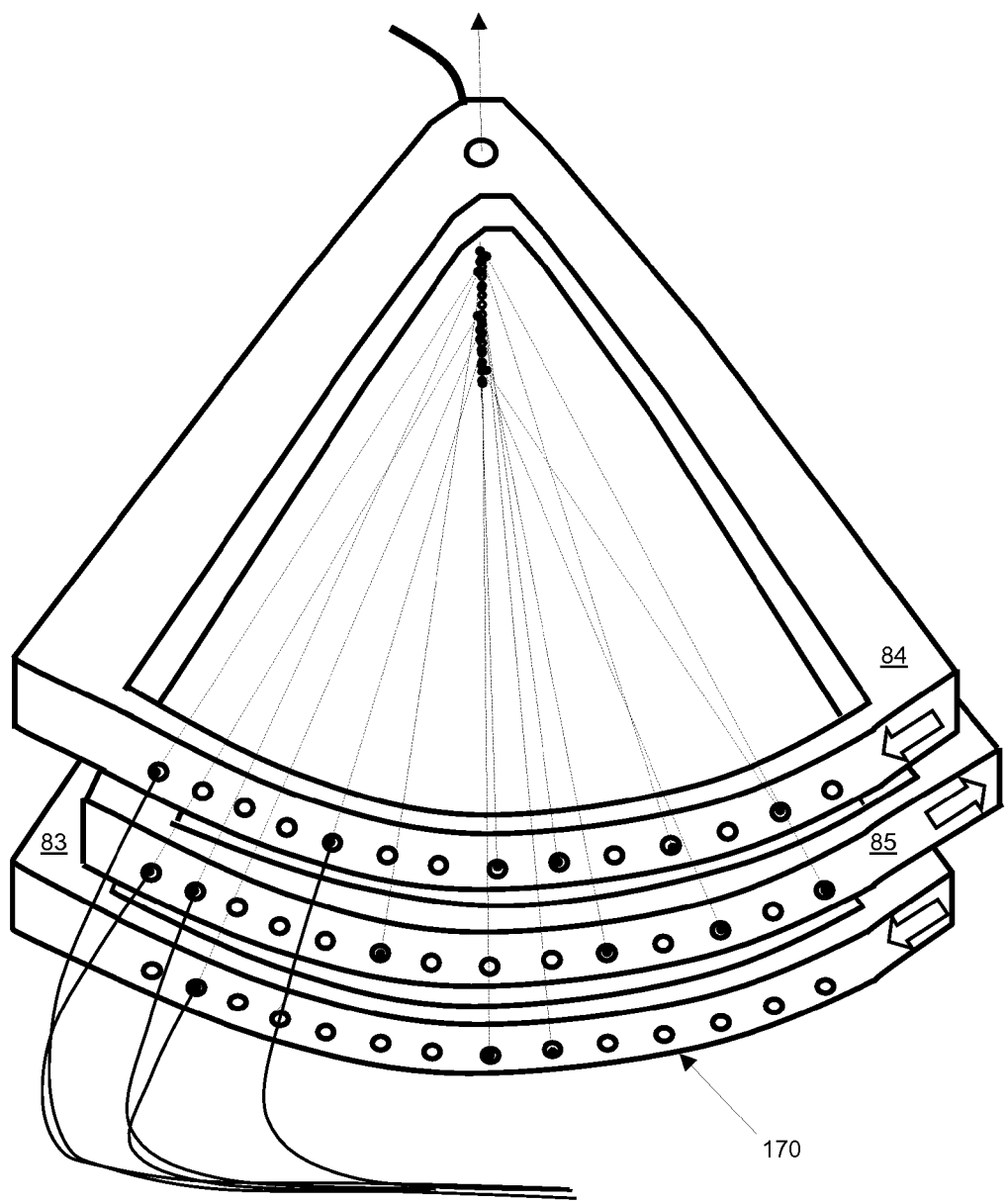
FIG. 10 is a schematic view of three stacked connector rows arc segments arranged to independently rotate about a common axis in the vicinity of the backbone, with row arc segments independently actuated to produce a proper weaving pattern.
Figure 11:
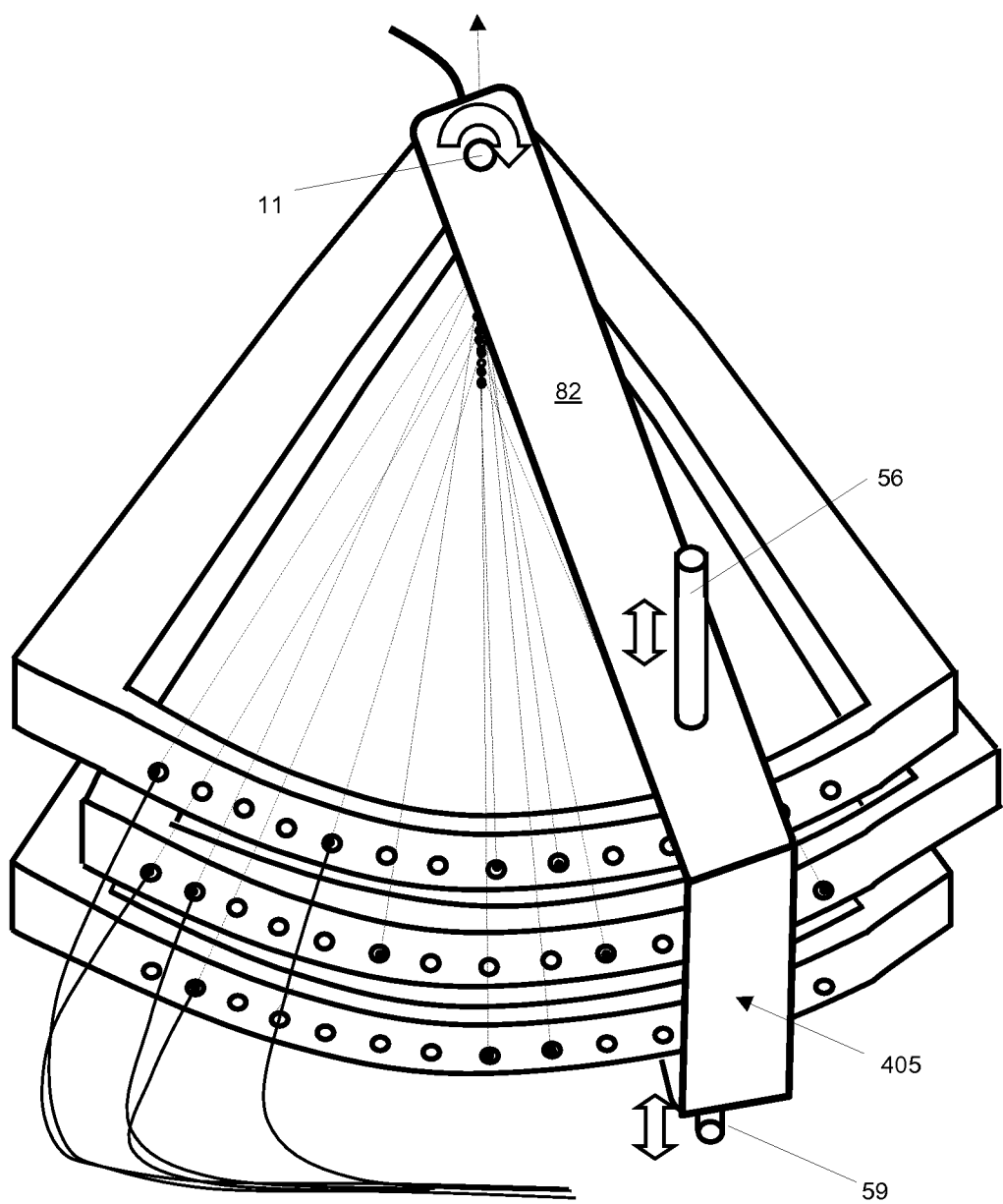
FIG. 11 illustrates the relationship between the interconnect transport mechanism extending around the connector rows.
Figure 12:
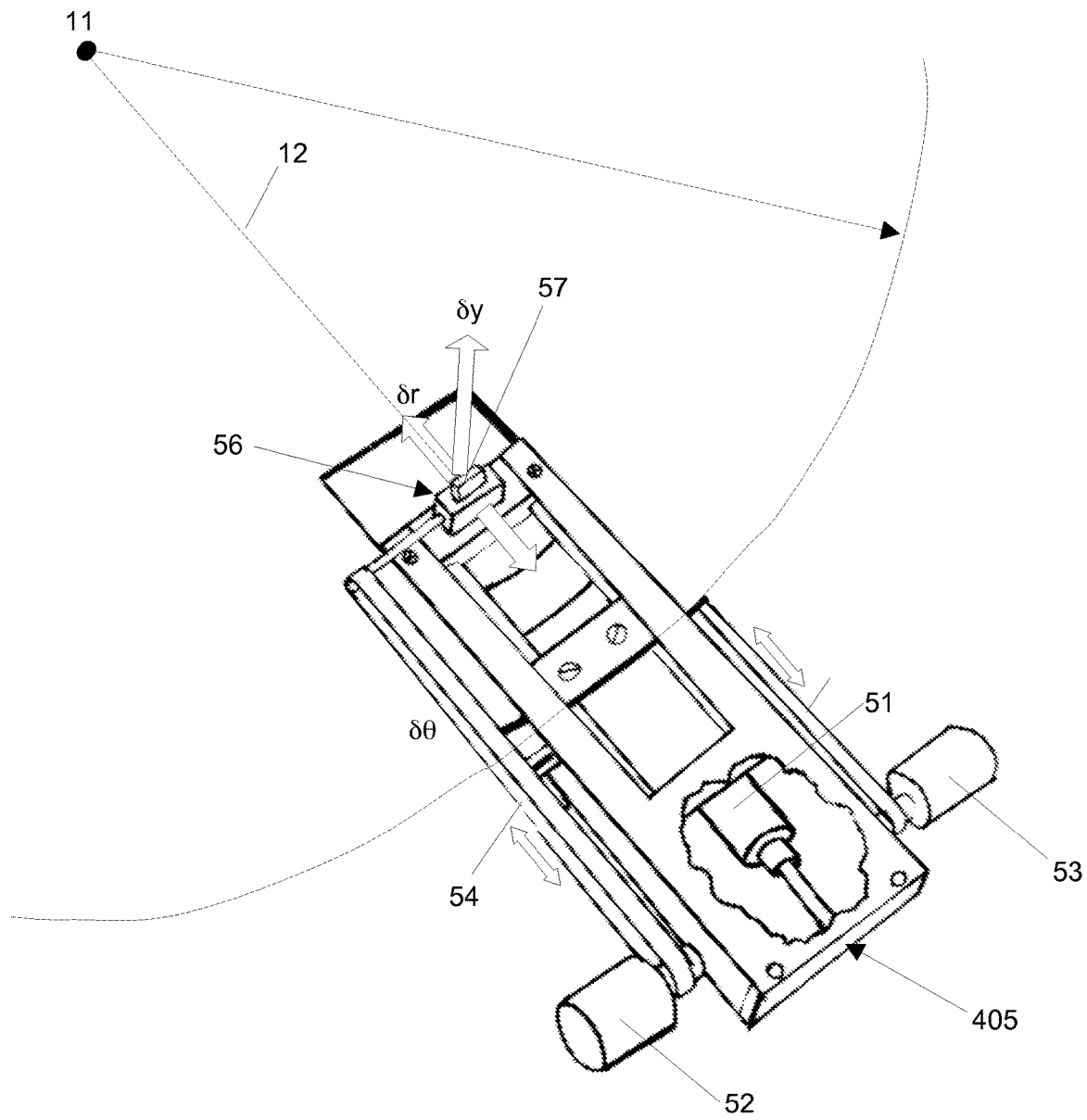
FIG. 12 details the interconnect transport mechanism.

FIG. 9 illustrates the key geometrical relationship dictating the acceptable variation in straight line distances from the backbone to a connector port, $L_1$, $L_2$ such that the length of slack fiber when plugging into different ports of the two dimensional cylindrical connector array is minimized to an acceptable level. To prevent unmanageable slack fiber length that could lead to entanglement, bending and breakage of fragile optical fiber strands 21, it is necessary to limit the variation in straight line distances $L_1$ and $L_2$ for all possible locations in the array to less than +/−10%, preferrably less than +/−5%. This latter requirement is summarized in Equation 1 below:

$$2(L_1-L_2)/(L_1+L_2)=0.05. \qquad \text{Eq. 1}$$

This relation is valid for $R/\Delta H > 5$, where R is the radius of the cylindrical array and $\Delta H$ is the elevation of the stacked discs or distance from the bottom most connector port to the upper most connector port. Equation 1 represents the conditions under which the need for slack fiber take-up reels is eliminated. By maintaining the ratio of the diameter D of connector discs 83, 84, 85 to aggregate height of these discs sufficiently large, the connector ends 65 of fixed length fiber strands 21 can reach any connector port 63. This equation places a practical limit the number of ports for a system of a given footprint, because scaling to large port counts generally requires the addition of connector discs, thereby increasing $\Delta H$, or to the increase of diameter D to allow for an increase in the number of spaced-apart ports along its perimeter.

In accordance with the present invention, the internal fiber configuration is arbitrary and infinitely reconfigurable without entanglement of fiber optic strands. Typically, the radius of the arc will be 6 to 8 inches, and the height of the arrays will be 1 to 2 inches. In practice, this is sufficient to allow fixed length fiber strands to be used in the interconnect region. For this configuration, the fiber strands are fixed at the backbone and of constant length, and the fiber connectors move adjacent to the interior of the two dimensional array of connectors.

The present three dimensional cylindrical configuration of strands enables this switching system to exhibit high density and compactness, thereby fitting within the size and form factor constraints of adopted computer industry standards. A 48×48 port cross-connect switch is 1 U (=1 Rack Unit=1.75") tall and 17.5" wide, and a 96×96 port cross-connect switch is 2 U (3.5") tall and 17.5" wide. Therefore, a practical upper limit for the diameter D is about 17.5 inches. It is of great practical benefit to satisfy this size constraint because it enables such devices to be deployed in the common "top-of-rack" application and automatically manage the high bandwidth interconnects within a rack containing external fiber optic signal sources.

Figure 3:
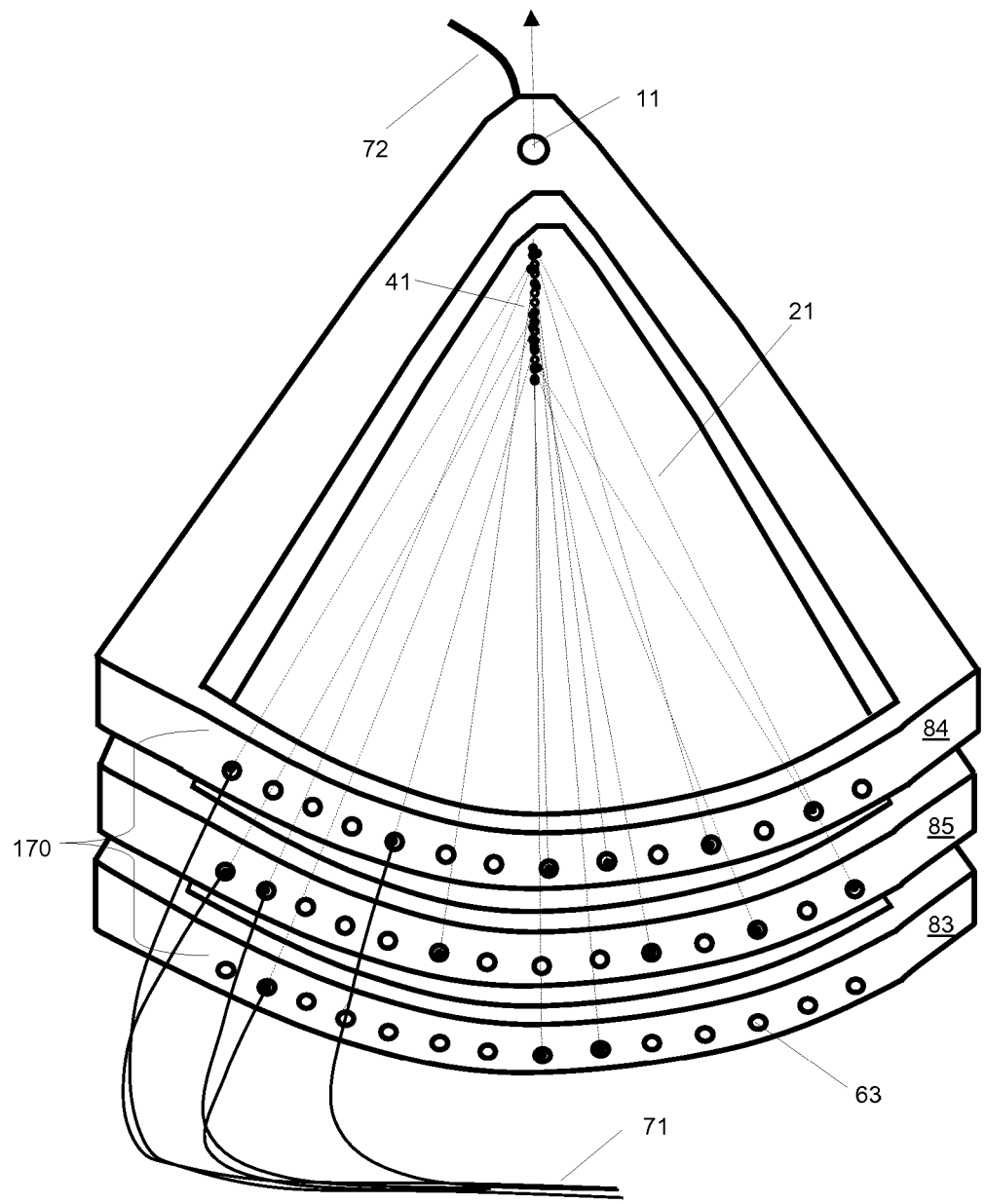
FIG. 3 is a schematic view of a particular example, in which three stacked connector row arc segments are arranged to independently rotate about a common axis in the vicinity of the backbone, with fiber strands spanning locations on the arc segments to locations on the backbone.

In a particular embodiment of the invention (FIG. 2), two connector rows 83, 84 are arranged on arcs and their rotation angle is varied between one of three fixed angles, by use of an actuator such as a motor or solenoid. The upper row 84 is actuated by motor 33-1 and the lower row 83 is actuated by motor 33-2. In a preferred embodiment, motors 33 are linear stepper motors and the three angles are precisely established by photointerruptors. Each row 83, 84, 85 is mapped to a sector of a disc, with an interior cutout surrounding the interconnect volume 108 and sharing a common pivot point 11 (FIG. 3). Multiple rows are arranged in this stacked disc configuration with each disc individually and independently rotatable about pivot 11. One or more parking rows 83 provide extra, temporary locations for unused fibers or inactive communication circuits.

In a particular example of this invention, couplers 63 are comprised of precision ceramic split sleeves with an inner diameter slightly smaller than 1.25 mm, such that when a 1.25 mm outer diameter ferrule 61 of the fiber connector 65 is inserted, the opposing ferrules touch and are aligned coaxially to the corresponding mating ferrule 61 of the external input fiber 71, thereby providing a low loss connection and retaining ferrules under friction.

Each row of connector receptacles 63 is formed on the rotating arc segment. Small rotations produce the row shuffling as determined by the KBS algorithm. The extension of this architecture to a greater number of rows is depicted schematically in FIG. 8. The spacing of discs 81, 82, 83, 84, 85 in elevation and the spacing of connector receptacles 63 in arc length is minimized based on the size of the connector 65 and receptacle 63. Moreover, typically some fraction of the connector receptacles 63 will be empty at any one time, and at least one connector receptacle of the array must be empty at all times to complete the process of emptying out any port to prepare for reconfiguration into that port. Connector discs independently pivot about a common axis of rotation 11. In a further example, there may be additional connector discs with extra receptacles that are configured with an offset angle to carry the fiber underneath or above the other fibers. In FIG. 2, one parking row 83 is provisioned as the bottom most row of the two dimensional array to provide extra locations for unused fiber circuits.

Note that the auto cross-connect architecture applies equally well to other transmission media such as copper cables, including Ethernet cables. However, these cables are typically larger in diameter than optical fiber cables so the density of connections may be reduced. Alternatively, copper to fiber media converters can be added to the fiber optic cross-connect implementation to provide a common switch platform that supports both copper and/or fiber transmission. Also, this architecture can be applied to multi-fiber connectors such as the industry standard MTP/MPO. In this case, each interconnect strand may itself a bundle or ribbon containing 4, 8, 12, etc. individual fibers and each connector 65 may consist of multiple signal carrying fiber cores.

Interconnection Transport System and Grippers

In the preferred embodiment illustrated in FIG. 2, the interconnection transport system is a miniaturized three-axis pick-and-place system with servo motor or stepper motor controls for precise positioning of the synchronized gripper pair. Furthermore, the miniaturized mechanism 405, by virtue of the small actuation forces involved, may be fabricated substantially from injection molded plastic elements and printed circuit board assemblies. The synchronized gripper pair is able to clasp onto any connectorized internal fiber, and disengage or engage the connector 65 from an internal receptacle 63. The grippers may further include a miniature built-in camera, light source and electromagnet.

The combination upper gripper 56 and lower gripper 59 (FIG. 13) carries the fiber 21 above and below, respectively, the other internal fiber strands. In this example, each gripper includes a magnet 93 and a shaped magnetically permeable iron or steel core 92 including an insulated wire coil to generate a switchable magnetic field. Application of a current to the core results in the deactivation of the net magnetic force at the tip of the core 92 upon application of a suitable electrical current. A temporally shaped electrical current pulse to the coil counteracts the permanent magnetic field produced by magnet 93 such that the attraction to the magnetic housing 27 of the fiber optic connector 65 is diminished and the connector 65 is detached from the gripper. This allows the two grippers 56, 59 to hand-off connectors between one another, and to simultaneously release the connector once it is firmly mechanically latched into its connector receptacle 63 by friction of the split sleeve, or by a magnetic or physical latch. Note that upon loss of electrical power to the system, the use of permanent magnets 93 within the grippers 56, 59 ensure that the fibers 21 are not dropped within the interconnect volume 108.

In a particular example, the interconnection transport system 405 has actuators for motion along R (radius) and Y (height) which are integrated into a rigid, rotating actuation disc(s) 82, 81 with precise angular actuation by motor 55. The upper gripper 56 is attached to upper actuation disc 82 and the lower gripper 59 is attached to the lower actuation disc 81, whereby these discs are fixed to one another and rotate together about the rotation axis 11 to move the fiber interconnection transport mechanism 405 to a particular angular location above a column. The one or more grippers 56, 59 travel up and down in between connector columns and plug in connectors into any of, for example, 96 receptacles 63 (by translating gripper(s) along R axis).

In a further example, movement of the grippers in Y direction is achieved by a molded plastic rack and pinion system coupled to separate motors using miniature timing belts and/or gearing. The multiple stacked discs, also substantially injection molded, are independently rotatable by individual motor drive system(s) utilizing stepper motors, dc motors, solenoids, etc. and sensors to detect the absolute rotation angle. The external or front fibers 71 are collected from the outside of the disc 83 and have sufficient slack cable to accommodate the small rotation of discs. Connector disc 83, 84, 85 rotation is limited to approximately one connector column spacing, approximately 1.5 degrees, while the actuation disc 81, 82 rotation spans the full angular range of the connector array, approximately 60 degrees.

Multistep Reconfiguration Process

Figure 14:
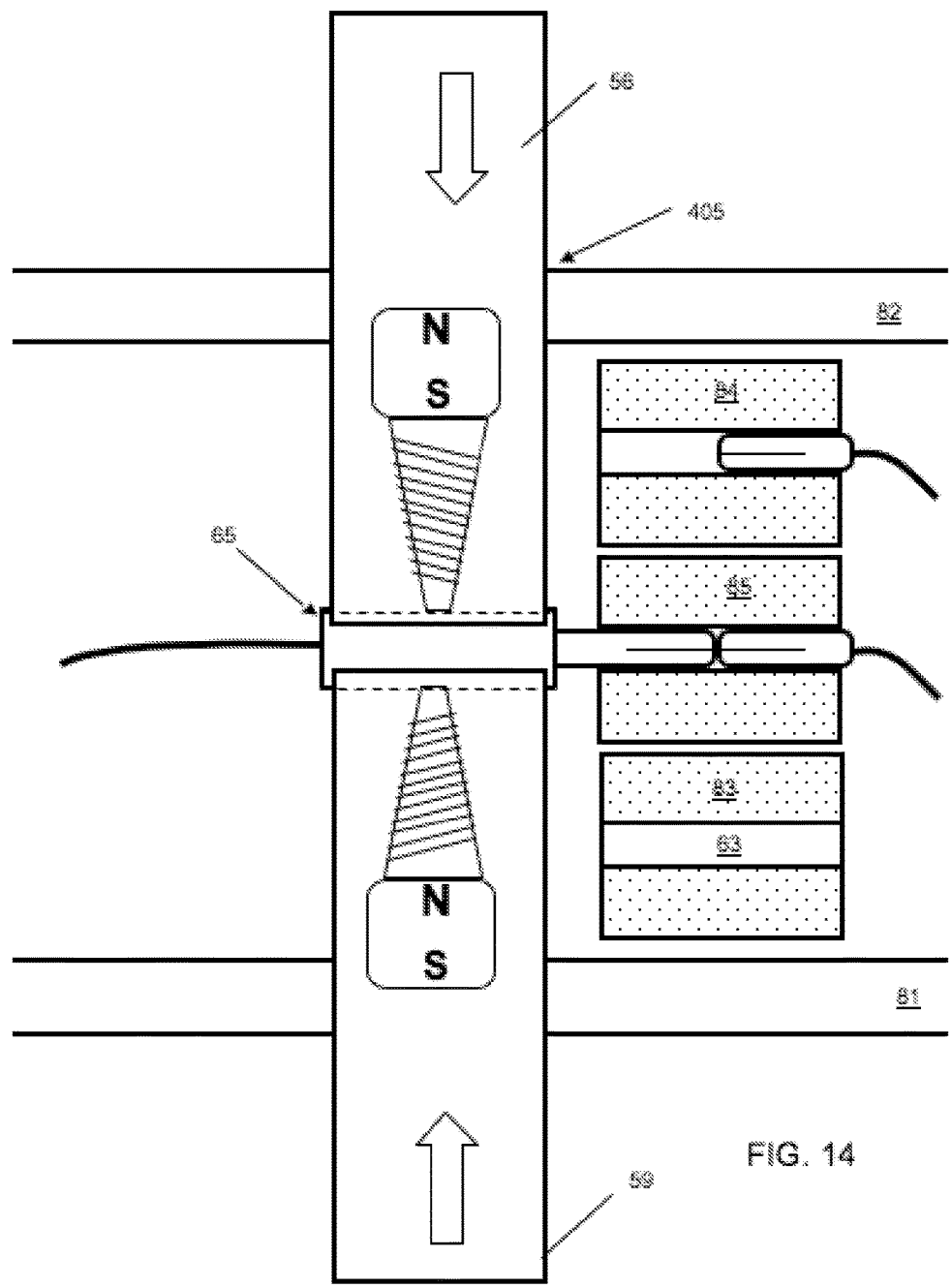
FIG. 14 illustrates the synchronized grippers after engagement with an individual fiber connector.
Figure 15:
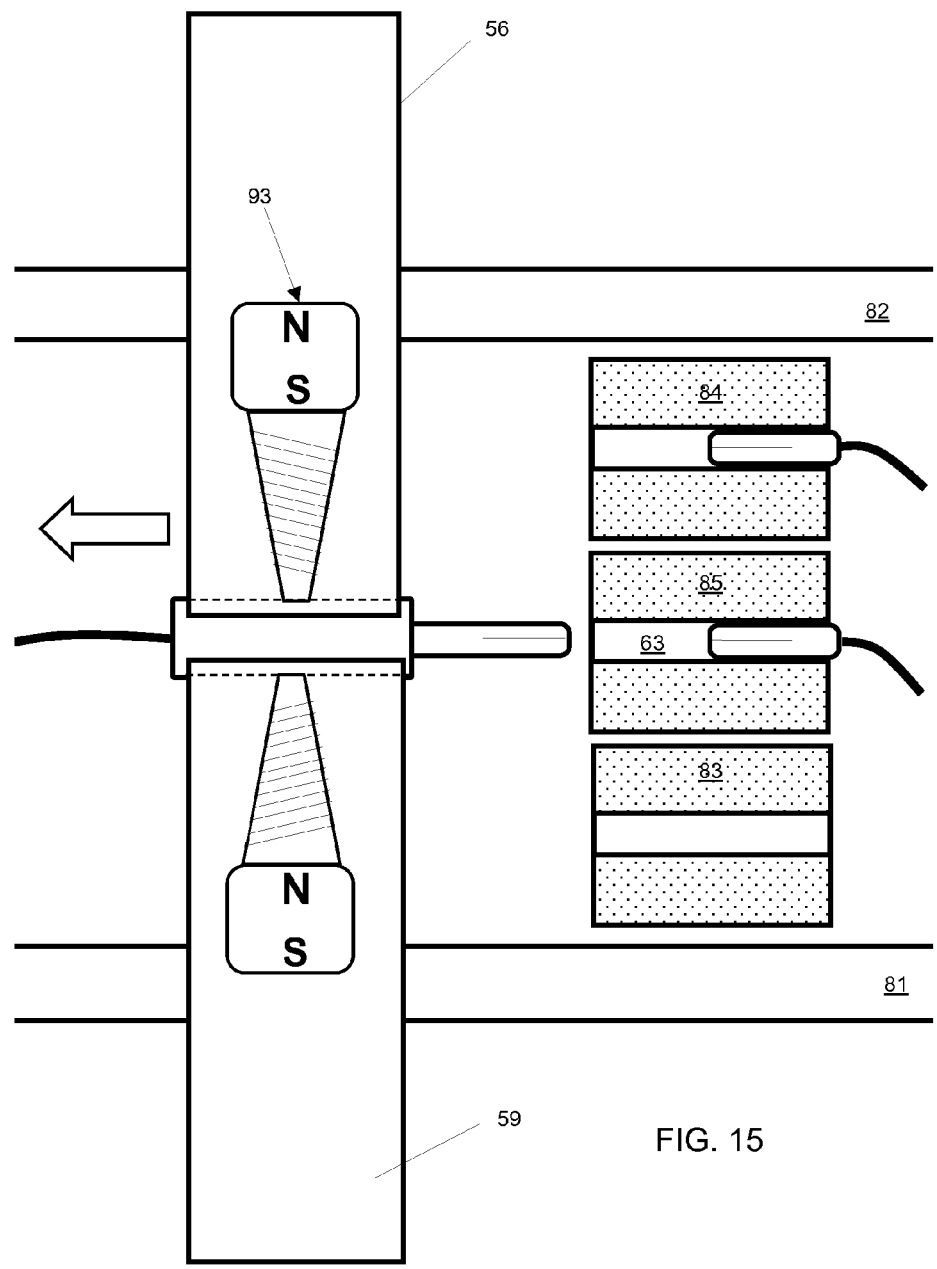
FIG. 15 illustrates the grippers after unplugging the fiber connector from the connector port on arc.
Figure 16:
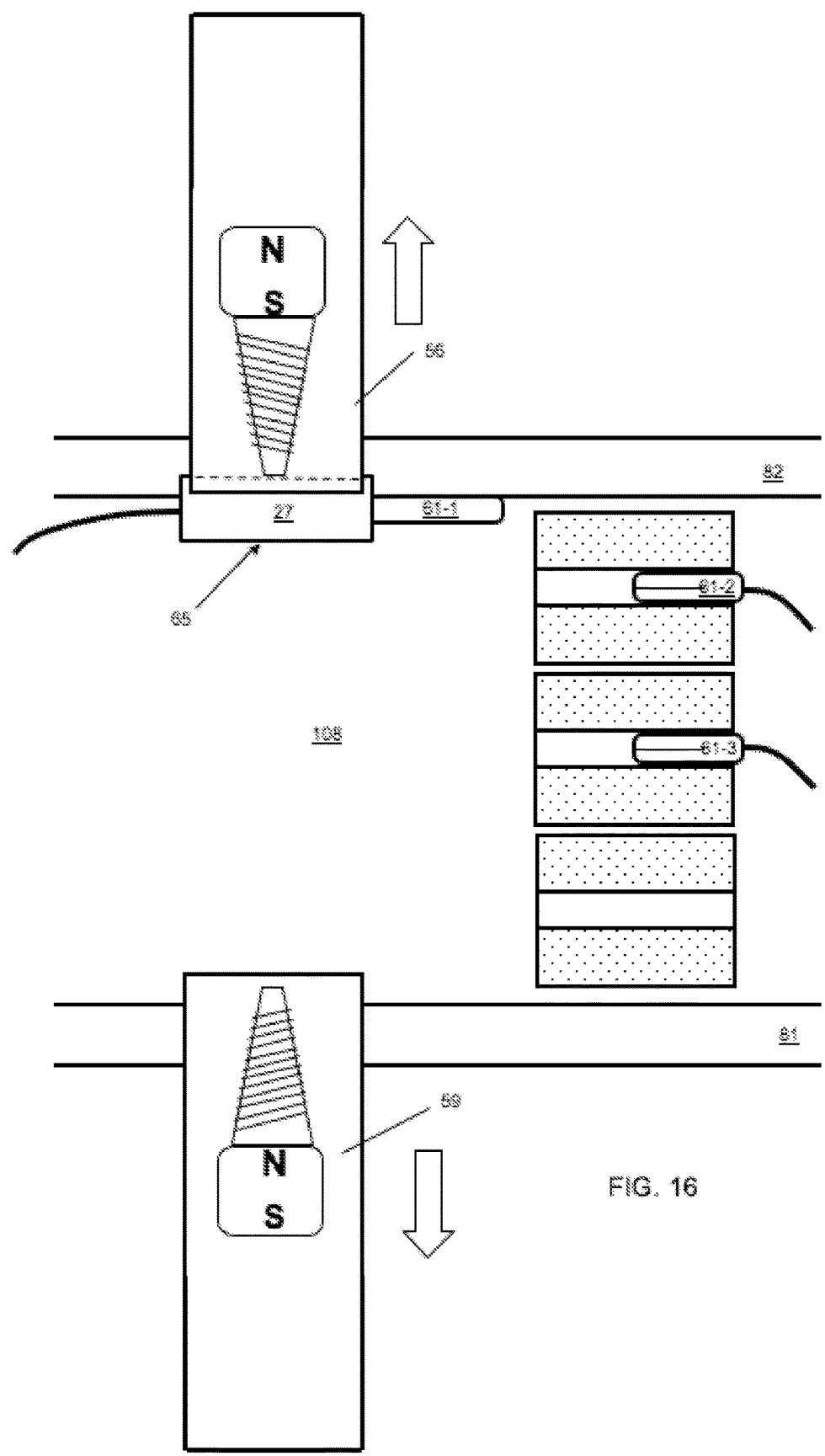
FIG. 16 illustrates the upper gripper latched onto and lifting the fiber connector above the top of the interconnect region, in preparation for passing over the upper most fiber connectors while the connector arcs below shuffle programmatically.
Figure 17:
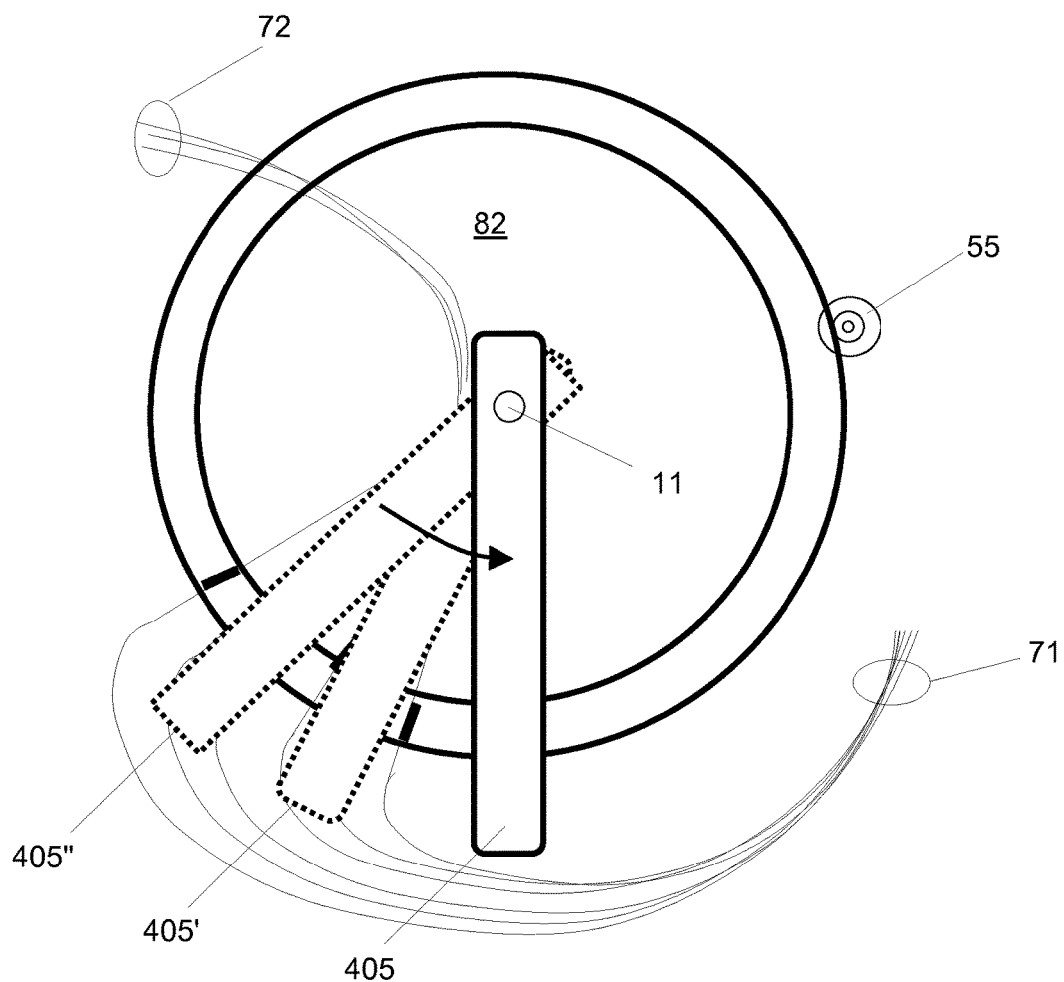
FIG. 17 is a simplified top view illustrating the rotation of the connector transport mechanism as it carries the fiber above (or below) the intervening fibers.
Figure 18:
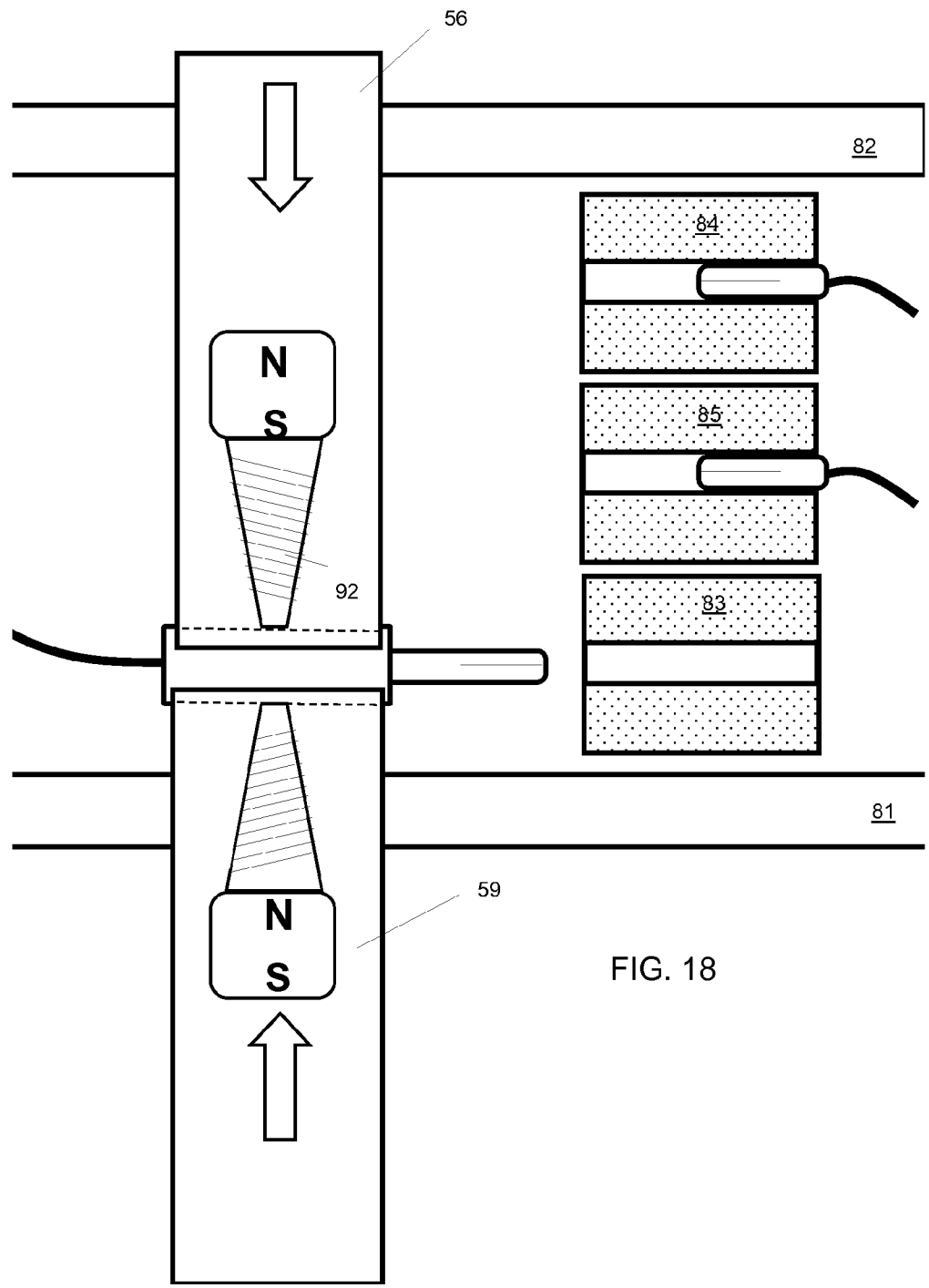
FIG. 18 depicts the upper gripper lowered back into the fiber interconnect region, with the lower gripper latching onto the same connector to prepare the fiber for insertion to connector port.
Figure 19:
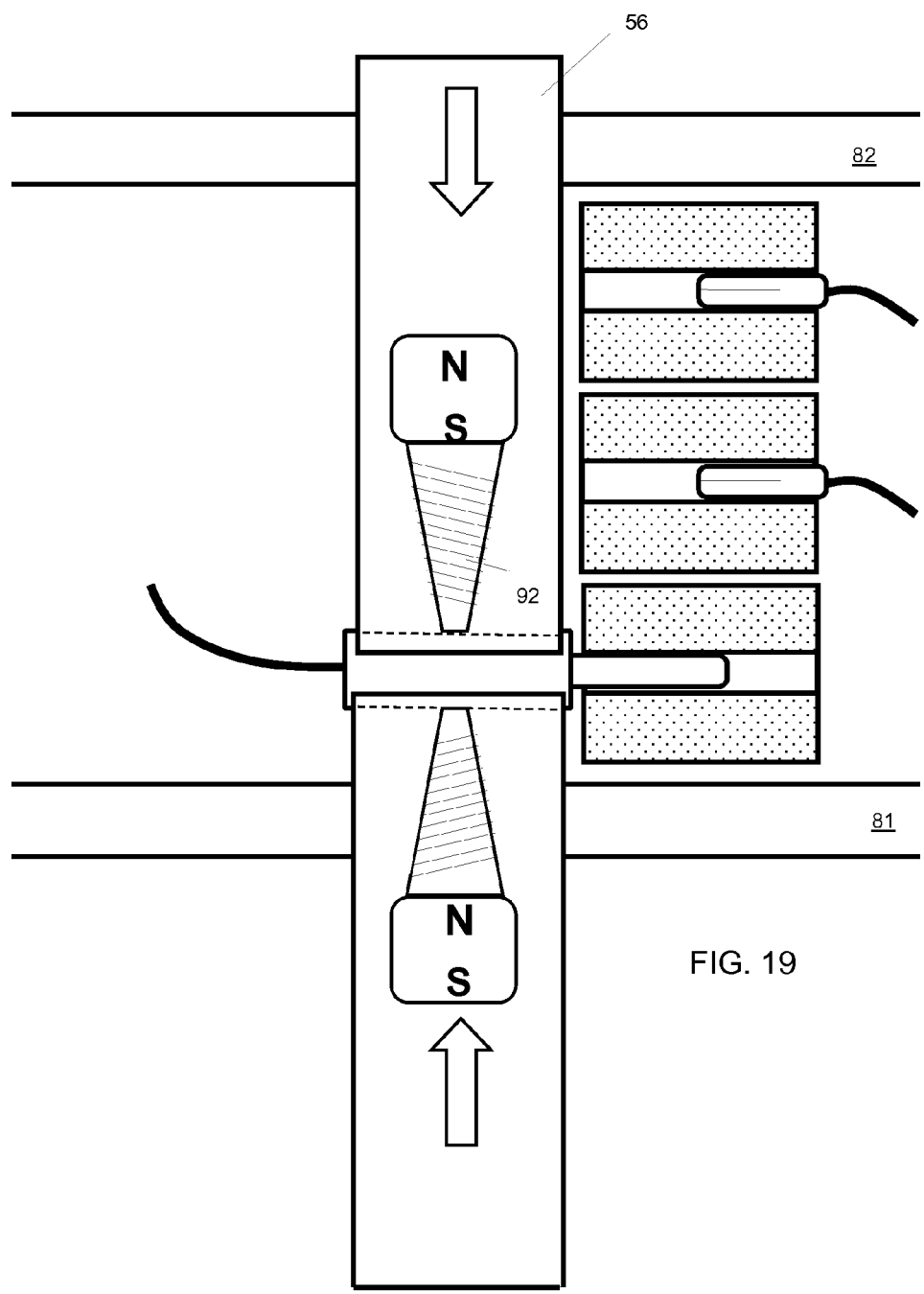
FIG. 19 illustrates the connector after inserting into destination connector port.
Figure 20:
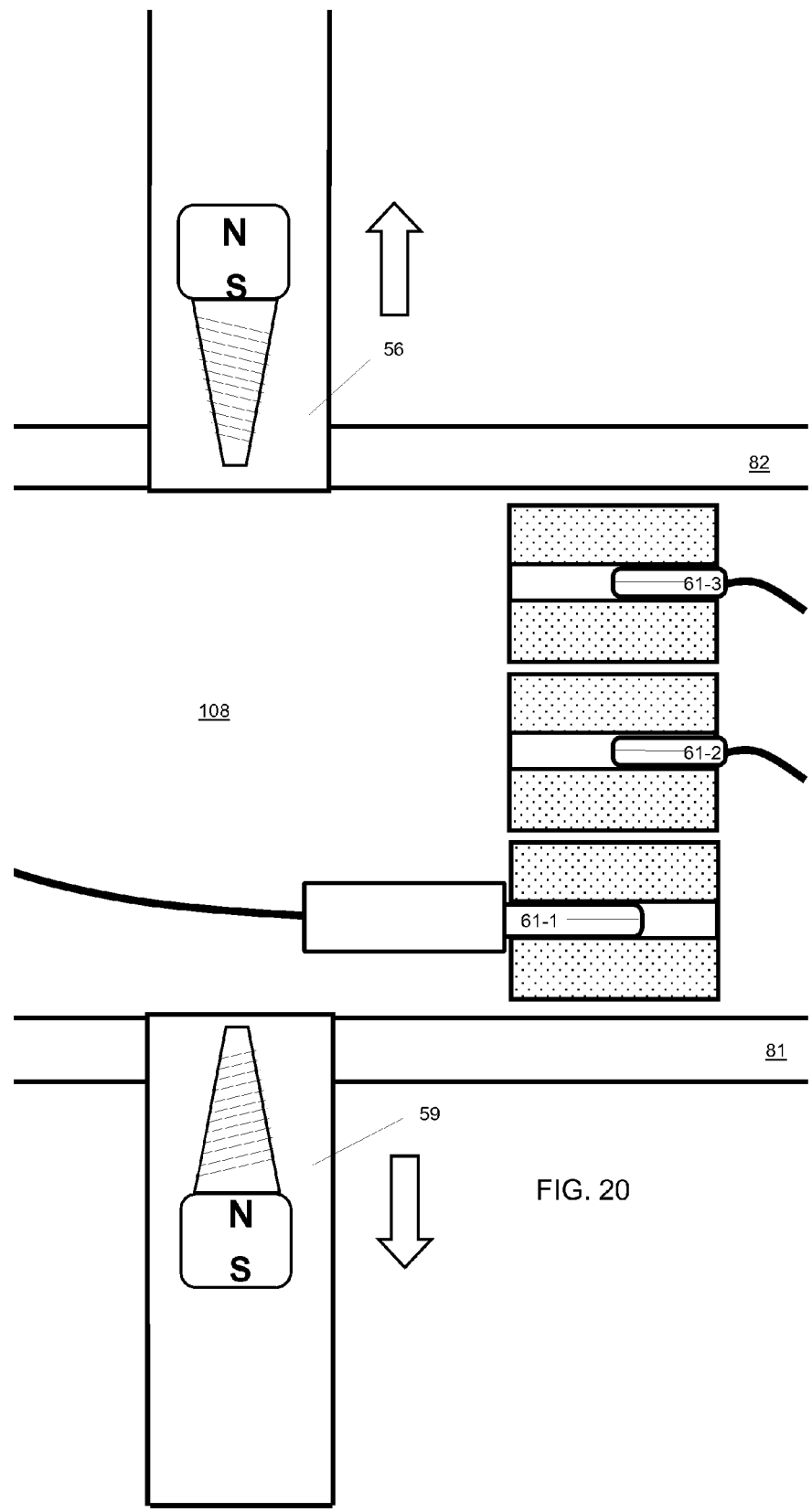
FIG. 20 illustrates the gripper mechanism after the synchronized gripper pair is withdrawn from the interconnection region.
Figure 21:
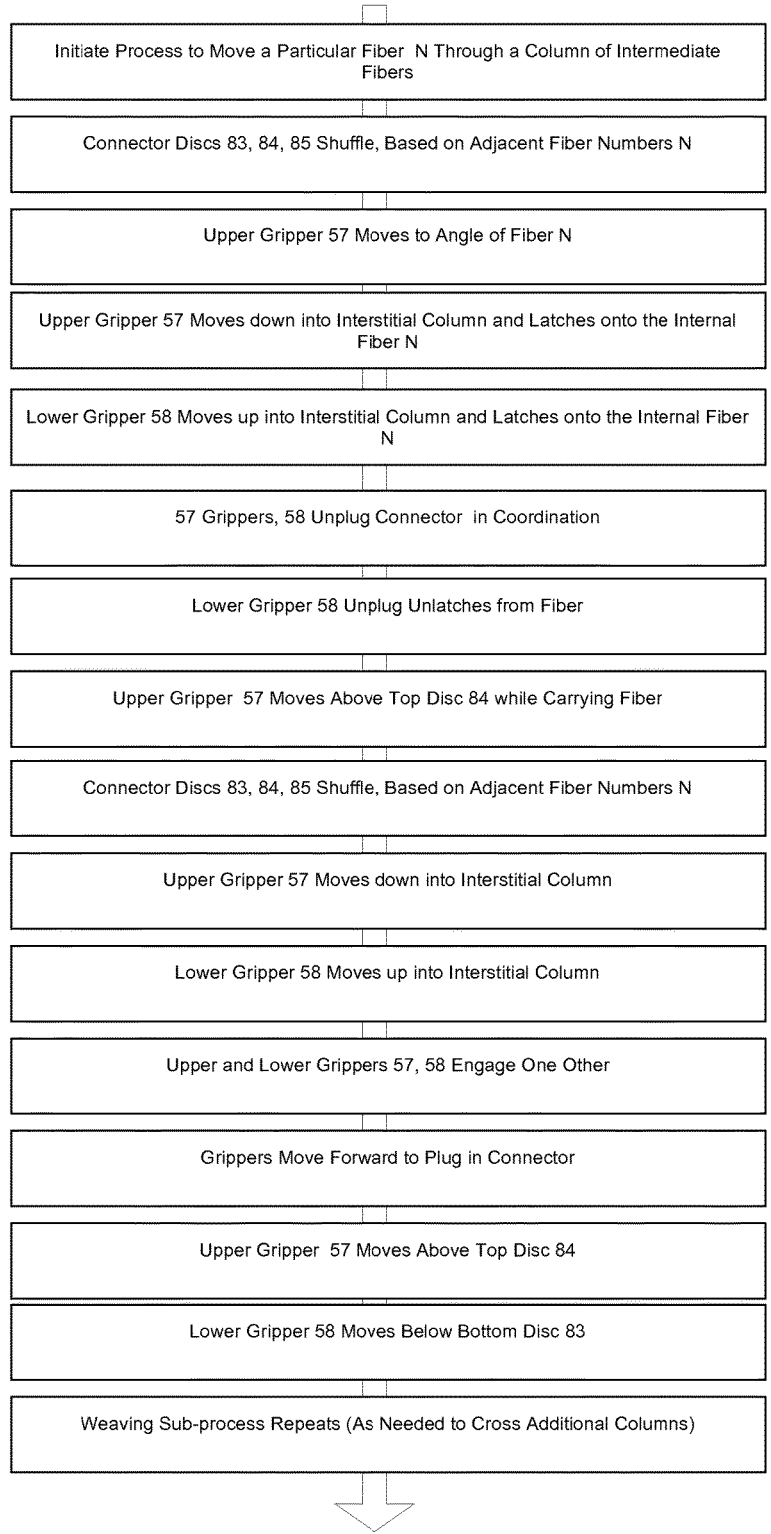
FIG. 21 is a flow diagram presenting the sequence of steps necessary to weave a fiber across an intervening column or zone of other fibers, in a non-contact, non-entangled fashion in accordance with the KBS algorithm.

FIG. 21 is a flow chart of the reconfiguration process in accordance with the invention. This chart illustrates a representative example of the sequence of steps to move a fiber across an adjacent and intermediate column or subbraid without entangling the other fiber strands within this subbraid. Note that this process is repeated sequentially to reconfigure a fiber if it needs to move across multiple columns to reach its target port. FIGS. 13-20 illustrate the multi-step fiber connector-gripper-coupler exchange process. First, the upper gripper 56 and lower gripper 59 (FIG. 13) move towards one another and latch onto a selected fiber 21 with connector 65 (FIG. 14). In synchronization, they extract (FIG. 15) the internal fiber 21 by withdrawing radially while operating at a particular angle and elevation within the intercolumn gap. The lower gripper is then magnetically unlatched and withdrawn, while the upper gripper 56 remains magnetically latched onto the connector. The upper gripper then carries the fiber above the top fiber populated disc 84 (FIG. 16). Thereafter, the connector discs 83, 84, and 85 shuffle incrementally in angle based on the transported fiber number and the adjacent column fiber numbers N, as calculated by the controller 70. The interconnection transport system 405 then moves by a small angle to the next column by pivoting about axis 11, as shown in FIG. 17. Next, the upper gripper 56 descends to bottom actuation disc 83 (FIG. 18) while carrying the fiber and the lower gripper ascends to latch onto connector in coordination. The grippers work in tandem to implant the connector 65 into coupler 63 as shown in FIG. 19. Next, the grippers disengage from this connector 65, which is now retained and/or latched within coupler 63, and the grippers move vertically out of the interconnect region 108 in opposite directions as shown in FIG. 20. This subprocess achieves the successful crossing of a single column or subbraid without entanglement. This subset of steps repeats in a column by column basis across the array of connectors until the target coupler within the destination column is reached.

Strand Geometry and KBS Algorithm

Figure 4:
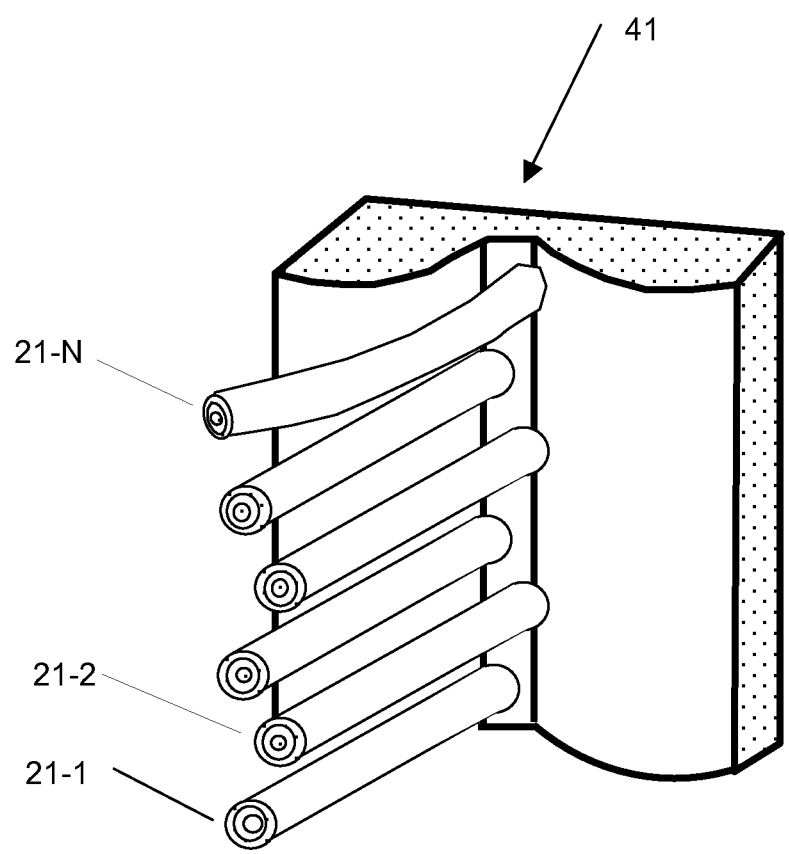
FIG. 4 details the stacked fiber arrangement comprising the backbone.
Figure 6:
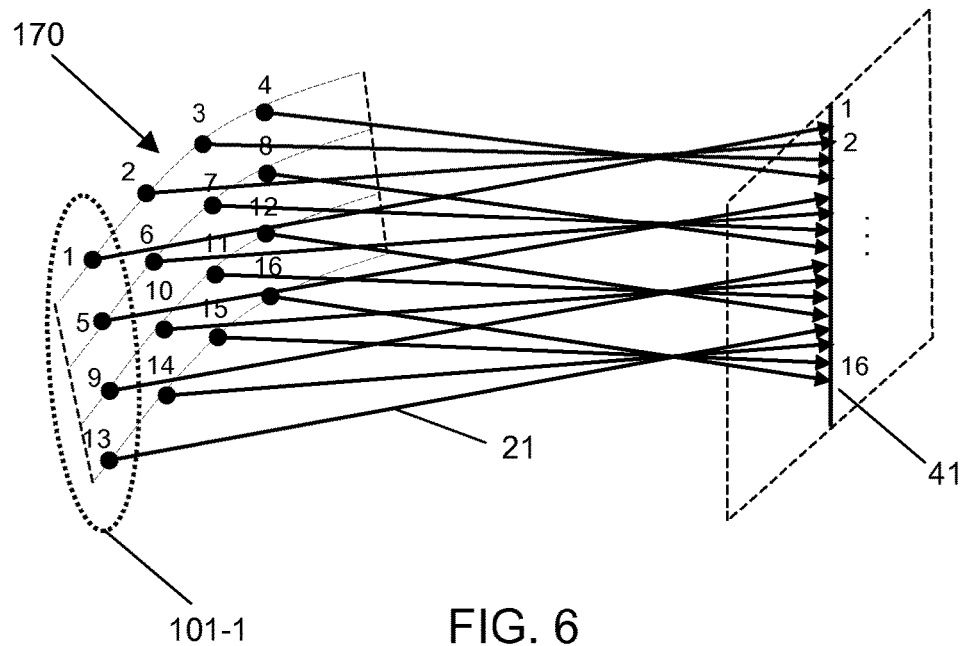
FIG. 6 is an schematic representation of the fibers joining the cylindrical array to the backbone, and an example configuration of numbered fibers therebetween to illustrate the geometrical relationships of fibers.
Figure 7:
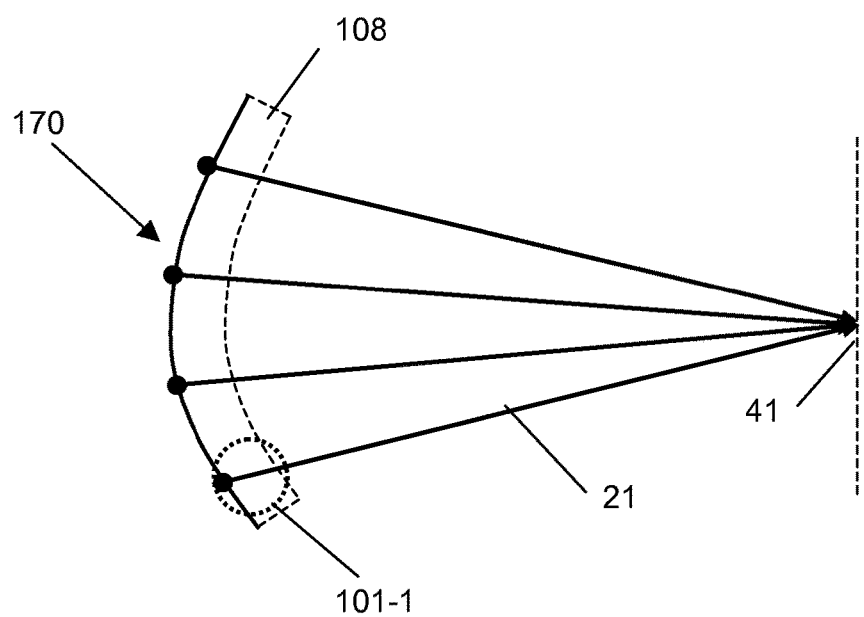
FIG. 7 is a corresponding top view to FIG. 6, illustrating the constrained region inside the cylindrical connector array in which the fibers are routed.
Figure 8:
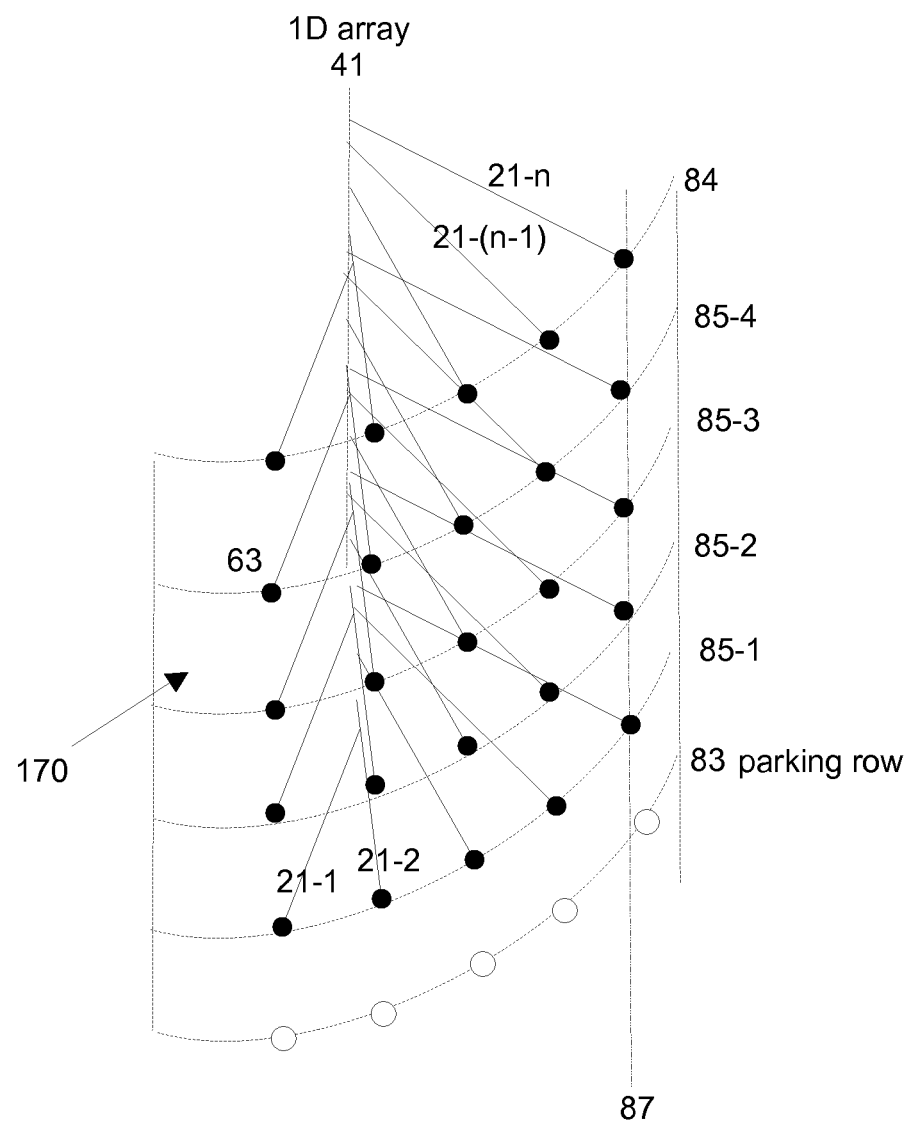
FIG. 8 is a schematic view of the transformable cylindrical array with a bottom-most parking row for the purpose of temporarily placing unused fibers.

As diagrammed and generalized in FIGS. 6-8, the system of fiber optic strands 21 extends between changeable terminals 63 disposed in a two-dimensional curved matrix 170 and a fixed linear array of points 41 at a mid-span position along the strands, parallel to the axis about with each disc 83, 84, 85 rotates. The fiber optic strands are further arranged into multiple independent subbraids 101 in the vicinity of each column of internal coupler ports. The backbone 41 is comprised of a fixed, linear arrangement of fibers, as illustrated in FIG. 4. Each strand 21 originates from a unique, unchangeable location within the one dimensional backbone 41, this location serving as the unique address for each fiber and utilized by the routing algorithm to properly weave the fiber around surrounding fibers. Fibers passing through the backbone exit the interconnect volume to the multiplicity of fixed output fibers 72.

In reference to FIG. 8, the transverse gaps between vertical connector columns 87 and the corresponding fiber subbraids 101 adjacent to the two-dimensional cylindrically curved input matrix 170 are sized to permit transport of the gripper. The actuator is able to move the strands parallel and transverse to the columns 87. In the preferred embodiment, the coupler columns 87, backbone array 41 and actuator arm of transport mechanism 405 are all parallel. The multiplicity of fiber optic strands 21 are disposed in an arbitrary yet spatially coherent, deterministic and programmable configuration while having substantially similar lengths between a fixed backbone array 41 parallel to one axis at a first plane and interconnected to variable positions at a second two-dimensional curvilinear plane 170. The disclosed fiber optic cross-connect system establishes arbitrary, low loss optical links between a multiplicity of input connections 63 and a multiplicity of output fibers 72, joined by continuous, suspended lengths of low loss, flexible fiber optic waveguides. In fact, any other transmission media including copper wires, flexible tubing, etc. can be employed in an alternate embodiment of this invention.

Input coupling connections 63 are disposed in a regularly spaced, two-dimensional curvilinear array 170, the array having a number of original columns N and a number of shiftable connector rows M on a disc 83, 84, 85, etc., wherein the array of input connections are in a dynamic angular relation about a common axis parallel to backbone 41. Rows are incremented/decremented in angle to temporarily, reversibly and repeatedly transform to an array with N+1 partially filled columns 87 and M rows based on the KBS algorithm.

As described in the series of U.S. patents to Kewitsch et al., including U.S. Pat. Nos. 8,068,715, 8,463,091, 8,488,938, 8,805,155, which are hereby incorporated by reference, the interconnection of a 2-D input array of terminals 170 to a 1-D intermediate array of ports at backbone 41, in combination with a novel non-entangling fiber routing algorithm, allows fibers to be infinitely and arbitrarily reconfigured without entanglement. In a simplified example for illustration purposes, interconnect strands between a 4×4 terminal input array 170 and a 16×1 port intermediate array 41 are depicted (FIGS. 6 and 7). The strands 21 follow straight-lines between the input terminals and intermediate ports. The interconnections are inserted and maintained in a proper order such that each subbraid is non-repeating. That is, any two of its strands cross at most once. The strands 21 of the non-repeating braid are overlaid back to front or front to back, without intertwining. The 4×4 terminal input array 170 separates into subbraids 101-1, . . . 101-4. The two-dimensional array of circuits 21 is mapped into a one-dimensional array or backbone 41 with substantially straight-line paths therebetween. This unique geometrical arrangement partitions the collection of strands within switch interconnect volume 108 into multiple independent, non-interfering regions containing subbraids 101, wherein fiber circuits 21 lie at the nominal centers of these regions. The resulting topological order achieves the separation and retention of clusters of optical circuits 21 within substantially spaced-apart regions, wherein the strands of each region cross at most once. The deterministic yet arbitrary geometrical placement of each circuit 21 enables any number of arbitrary terminal reconfigurations to remain non-blocking and interference-free for reconfiguration as determined by the KBS algorithm. Strands do not span more than one subbraid 101 or column at any time during the reconfiguration.

The algorithms to re-arrange any circuit in a non-blocking fashion require knowledge of each interconnect's unique elevation within the backbone 41 and the sign of the braid. In the preferred embodiment and to speed reconfiguration, the signs of the braids alternate for each column 87. To move a strand n within column i to a column j, the subset of strands in column i lying between strand n and strand j must be identified, after which the proximal endpoint of this strand traces out a continuous path passing below the subset of strands with m>n and above the subset of strands with m<n. Accordingly, this invention further discloses methods for dynamically reconfiguring small diameter fiber optic interconnection strands 21 within a reduced height interconnect volume including a large number of other strands defining vectors and spanning a two-dimensional curved array of inputs and linearly ordered outputs, in a unique way that prevents entanglement.

The translation of rows within the two dimensional array of terminals is directed by controller system 70 to maintain a multiplicity of separate, strictly positive or negative non-repeating subbraids 101. The transport path 103 followed by the fiber 21 undergoing reconfiguration passes through one or more of the subbraids defining a column by programmed splitting of the subbraid into two partial sub-subbraids. Subbraid 101 is equivalent to the group of fibers 21 originating from the backbone 41 and connected to a particular connector column 87. It is substantially planar except for the thickness of potentially singly crossing overlapping strands. The programmed splitting is adequate to enable non-interfering passage of the affected fiber 21 through the temporary split formed within the subbraid. The two partial subbraids are then merged back to one after passage by affected fiber is complete. This is accomplished by reshuffling the angles of rows 83, 84, 85 as directed by the KBS algorithm.

Optical fiber cables 71, which remain external to the stacked arrangement of discs, extend individually to separate terminals of each row. Consequently, individual cables 71 have a flexible section adjacent the terminals to which they are coupled, can be assembled into groups, extended laterally parallel to the shiftable rows, and thereafter coupled into cable harnesses or fiber optic connector panels extending exterior to the system.

In conclusion, the reconfigurable, all-fiber system of interconnection disclosed herein exhibit ideal optical and scaling characteristics, and can be realized in various miniaturized geometries that enable new types of applications. Those skilled in the art will readily observe that numerous modifications and alterations of the system may be made while retaining the teachings of the invention. Accordingly, the above disclosure should be construed as limited only by the metes and bounds of the appended claims.

What is claimed is:

1. A system for selectively transferring broad band signals on different individual ones of multiple input lines to selected individual ones of multiple output lines comprising:
   a distributed array of signal carrying lines disposed within a first plane and extending from closely proximate output points along an output axis and therefrom along the first plane at different diverging angles but substantially equidistant lengths to different terminal coupler positions in a second plane, the lines to said positions being substantially equally laterally spaced apart thereat within a total arc of less than 180 degrees in the second plane;
   an array of fixed terminal coupler elements, each disposed along an arc contiguous to the terminal coupler positions in the distributed array in the second plane and each configured to detachably receive an individual movable terminal element;
   a line transferring device disposed substantially adjacent and parallel to the second plane and movable both radially and circumferentially with respect to the lines in the distributed array to transfer a signal carrying line from its prior terminal coupler to a new available coupler location in the array; and
   a control and command system retaining data as to current active and available line addresses in the distributed array, and responsive to transfer requests for controlling the line transferring device.

2. A system in accordance with claim 1, wherein the control and command system includes means for calculating a physical reconfiguration trajectory for the line transfer requested based on the data as to current active and available line addresses, and the trajectory being selected to ensure lines do not entangle during transfer.

3. A system in accordance with claim 1, wherein the lines are optical fibers with outer diameters of less than 0.5 mm and are substantially insensitive to bending of said optical fiber when the bend radius of curvature is more than about 5 mm.

4. A system in accordance with claim 3, wherein the optical fibers further comprise terminating connector elements each including a cylindrical ferrule, with the optical fiber lying on the central axis of the ferrule, to transfer said signals through the signal carrying lines with less than 0.5 dB insertion loss.

5. A system providing a multi-line optical switching network in which optical lines are repositionable such that different external sources can be selectively coupled to different outputs at a central axial region, the system comprising:
   a plurality of optical lines diverging extending from the central axial region to changeable coupler positions in separate adjacent and parallel planes, the optical lines in the planes lying separately within included angles of less than 180 degrees about the central axial region and the adjacent lines within the planes diverging from the central axial region at substantially uniformly spaced angles within said included angular dimension to chosen like radial lengths from the central axial region and each including a terminal coupler element for changeably coupling to a different external source;
   a plurality of individual line couplers, each coupled to a different external source and engageable to a changeable terminal coupler from the plurality of optical lines;
   a line engagement mechanism responsive to command signals for selectively engaging and releasing selected ones of the individual optical lines at chosen radial positions along the lengths thereof;
   a line repositioner responsive to position command signals for moving the line engagement mechanism along the planes to selected engagement and release positions with respect to individual lines within the plurality of optical lines, and
   a command signal generator providing engagement commands and repositioner commands to control the configuration of the plurality of optical lines in the system.

6. A system as set forth in claim 5 above, further including a plurality of changeable input couplers, each changeable in response to command signals, and each controlling the coupling between a line from an external source and an optical line in the network.

7. A system as set forth in claim 6 above, wherein the command signal generator comprises a system memory for storing data as to the existing configuration of lines in the network and a routing command system responsive to the data in the system memory for directing the operation of the line repositioner.

8. A system as set forth in claim 6 above, wherein the line repositioner comprises a line transport system configured to move the lines along a curvilinear path about the central axial region.

9. A system as set forth in claim 5 above, wherein the line engagement mechanism in the system further includes separate, small magnetic elements in each of the optical lines proximate to the end of the chosen radial length and the line repositioner further comprises signal activated electromagnets responsive to the command signal generator and laterally aligned with said magnetic elements for controllably engaging and disengaging the magnetic elements.

10. A system as set forth in claim 9 above, wherein the line engagement mechanism further comprises a magnetic device on each side of the line repositioner, said magnetic device comprising both a permanent magnet disposed to attract the magnetic element on its respective node, and a signal activated electromagnet responsive to the command signal generator and disposed to substantially cancel the magnetic field of the permanent magnet according to the signal.

11. A system as set forth in claim 5 above, wherein the system further comprises an inner frame configured to support the multiplicity of optical lines in the network, the optical lines extending from the central axial region within an arc of less than a semicircle to a curved engagement region comprising a curvilinear support including external couplers to external optical lines, and an adjacent line engagement system disposed in close proximity to the inner frame and comprising a support body rotatable about the central region of the inner frame to selectable angular positions, said line engagement system comprising a mechanical optical line engagement and disengagement system rotatable about the central region of the inner frame to different optical lines in the array to couple and decouple selected lines at locations specified by the command signal generator.

12. A system as set forth in claim 11 above, wherein the optical lines are disposed radially with regards to a common central axis at two separate levels in two different frames, and the system further includes means engaged to the different frames for incrementally moving a selected frame about the central axis.

13. An optical fiber networking mechanism comprising an inner frame including a central hub structure about a central axis and a circumferential arc segment thereabout, the arc segment being less than a semicircle about the central hub structure, and further including radial side arms extending from the central hub structure to the arc segment, the arc segment being radially spaced from the central hub structure by at least several inches;

the mechanism further comprising a plurality of optical fibers extending radially out from the central hub to the circumferential arc segment, at changeable circumferentially spaced points, the fibers being substantially of the same nominal length, and the fibers being distributed with both circumferential and height spacings to permit mechanical access therebetween.

14. A mechanism as set forth in claim 13 above, further comprising incremental drive means coupled to the central hub structure for controllably shifting the central hub structure incrementally about the central axis to effect optical fiber movement control, and means for angularly shifting the mechanism including the optical fibers about the central hub arc to enable a transfer device to physically access selected fibers of the plurality of fibers.

\* \* \* \* \*